(12) United States Patent
Liu et al.

(10) Patent No.: US 10,540,679 B2
(45) Date of Patent: Jan. 21, 2020

(54) TRACKING INTERACTION WITH SPONSORED AND UNSPONSORED CONTENT

(71) Applicant: Microsoft Technology Licensing, LLC, Redmond, WA (US)

(72) Inventors: Qi Liu, Saratoga, CA (US); Yawen Wei, Sunnyvale, CA (US); Lihong Pei, Mountain View, CA (US); Hardik N. Bati, Santa Clara, CA (US); Sanjay Sureshchandra Dubey, Fremont, CA (US); Waitat Peter Poon, Milpitas, CA (US); Xiang Yu, Sunnyvale, CA (US); Edward Wu, Fremont, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 531 days.

(21) Appl. No.: 14/945,153

(22) Filed: Nov. 18, 2015

(65) Prior Publication Data

US 2017/0091809 A1  Mar. 30, 2017

Related U.S. Application Data

(60) Provisional application No. 62/235,306, filed on Sep. 30, 2015.

(51) Int. Cl.
*G06Q 30/02* (2012.01)
*H04L 29/08* (2006.01)

(52) U.S. Cl.
CPC ..... *G06Q 30/0246* (2013.01); *G06Q 30/0273* (2013.01); *G06Q 30/0277* (2013.01); *H04L 67/22* (2013.01)

(58) Field of Classification Search
CPC . G06Q 30/02; G06Q 30/0245; G06Q 30/0273
See application file for complete search history.

(56) References Cited

U.S. PATENT DOCUMENTS

| 8,761,181 B1* | 6/2014 | Gostev | H04L 1/1614 |
| | | | 370/393 |
| 2002/0023000 A1* | 2/2002 | Bollay | G06Q 30/02 |
| | | | 705/14.58 |

(Continued)

OTHER PUBLICATIONS

Artail et al., "A Privacy-Preserving Framework for Managing Mobile Ad Requests and Billing Information" (published in IEEE Transactions on Mobile Computing on Aug. 1, 2015) (Year: 2015).*

(Continued)

*Primary Examiner* — James M Detweiler
*Assistant Examiner* — Patrick Kim
(74) *Attorney, Agent, or Firm* — Schwegman Lundberg & Woessner, P.A.

(57) ABSTRACT

Generally discussed herein are methods, systems, and apparatuses for tracking user interaction with sponsored and/or unsponsored content. A method can include receiving a tracking event packet including data fields comprising a packet identification, a tracking event identifier, a content identifier, a cost, a campaign identifier, and/or an advertiser identifier, determining whether the tracking event packet is a duplicate based on the packet identification, aggregating non-duplicate tracking event packets by advertiser identification such that packets with advertiser identifications that hash to a same value are aggregated together, and transferring aggregated tracking event packets to a first database and a second database, the first database includes data stored for analytics and the second database includes data stored for billing and campaign performance monitoring.

18 Claims, 14 Drawing Sheets

(56) References Cited

U.S. PATENT DOCUMENTS

| | | |
|---|---|---|
| 2008/0256056 A1 | 10/2008 | Chang et al. |
| 2009/0259518 A1* | 10/2009 | Harvey ............... G06Q 10/0639 |
| | | 705/7.29 |
| 2010/0161492 A1* | 6/2010 | Harvey ............... G06Q 10/0639 |
| | | 705/50 |
| 2010/0332454 A1* | 12/2010 | Prahlad ............ G06F 17/30082 |
| | | 707/654 |
| 2011/0029393 A1* | 2/2011 | Apprendi ........... G06Q 30/0277 |
| | | 705/14.73 |
| 2011/0055021 A1* | 3/2011 | Haag ..................... G06Q 30/02 |
| | | 705/14.69 |
| 2013/0304581 A1 | 11/2013 | Soroca et al. |
| 2014/0289018 A1 | 9/2014 | Vanderhook et al. |
| 2015/0039406 A1 | 2/2015 | Dubey et al. |

OTHER PUBLICATIONS

"Final Office Action Issued in U.S. Appl. No. 14/926,548", dated Oct. 19, 2018, 22 Pages.

"Non Final Office Action Issued in U.S. Appl. No. 14/926,548", dated Jan. 25, 2018, 25 Pages.

"Final Office Action Issued in U.S. Appl. No. 14/926,702", dated Oct. 19, 2018, 18 Pages.

"Non Final Office Action Issued in U.S. Appl. No. 14/926,702", dated Jan. 29, 2018, 22 Pages.

"International Search Report and Written Opinion Issued in PCT Application No. PCT/US2016/054518", dated Dec. 30, 2016, 13 Pages.

\* cited by examiner

TRACKING INTERACTION WITH SPONSORED AND UNSPONSORED CONTENT

TECHNICAL FIELD

Examples generally relate to systems, apparatuses, and methods for tracking user interaction with content.

BACKGROUND

The term "sponsored content" means content that some entity (e.g., a company, organization, person, or the like, sometimes called an "advertiser" herein) has paid or will pay to be presented to a user, with the hope that the user interacts with the content in some manner. In the context of this disclosure, the user is a user of a website. Sponsored content includes an advertisement, article, story, or other digital media that is presented to the user. A sponsored content campaign is an instance of an entity paying to get their sponsored content in front of users. The campaign can include a variety of criteria that must be satisfied for the website owner to be paid for satisfying the sponsored content campaign. For example, a sponsored content campaign can require a website to cause an advertisement to be displayed to a specified number of users or a specified number of times. In another example, a sponsored content campaign can require the entity to pay a specified amount each time a user clicks on the sponsored content or otherwise interacts with the sponsored content. Tracking the user interaction with the sponsored content, such as to determine if a sponsored content campaign is satisfied and/or the website operator should be paid, is challenging.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed herein.

DETAILED DESCRIPTION

Figure 1:
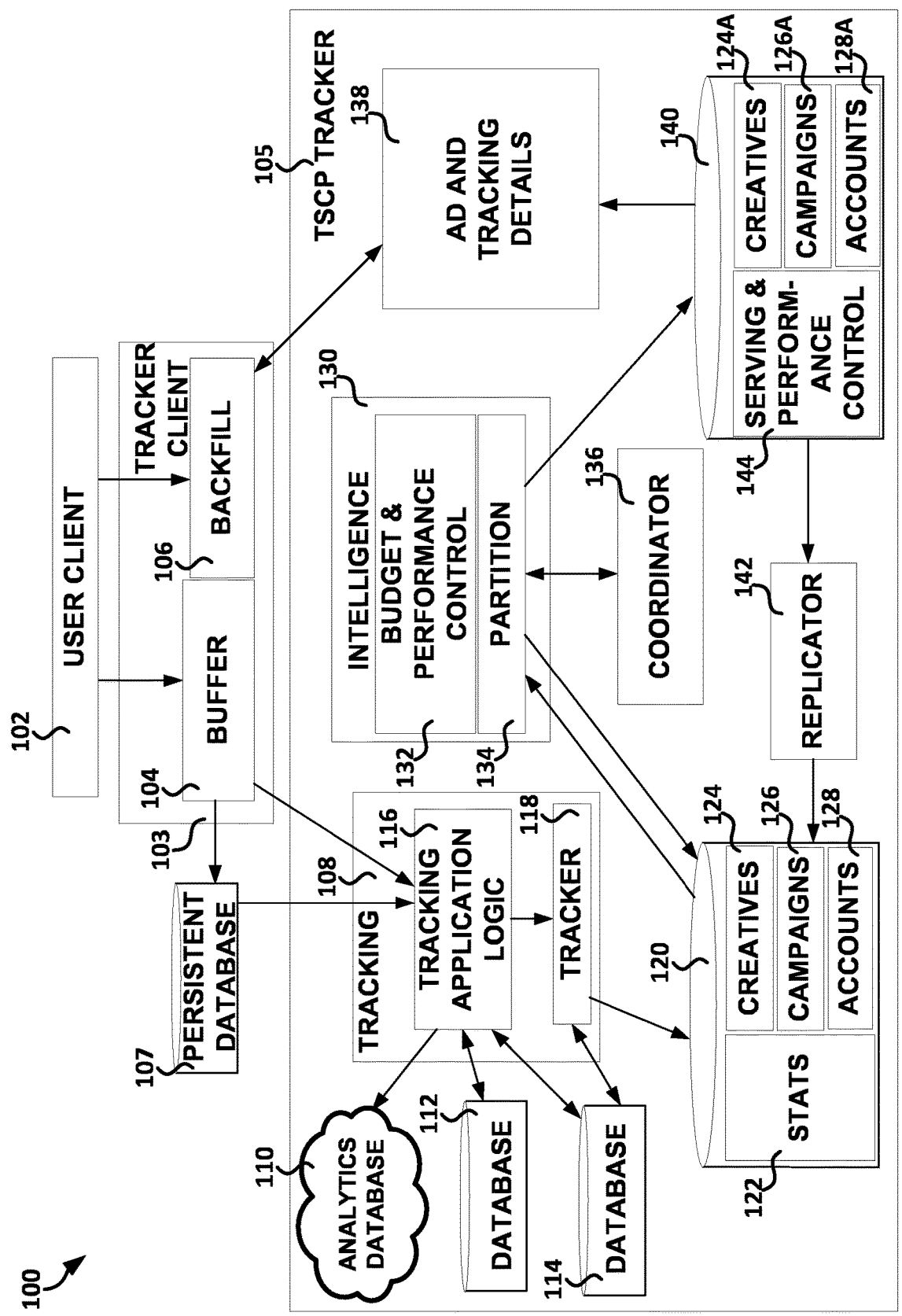
FIG. 1 illustrates, by way of example, a block diagram of an embodiment of a system for tracking sponsored and unsponsored content.

Discussed generally herein are systems, devices, and methods for tracking user interaction with content, such as can include sponsored and/or unsponsored content, such as can be presented on a web page of a website. Sponsored content can be presented to users in a variety of manners and at a variety of locations on the web page. For example, on the social networking website at www.linkedin.com, hosted by LinkedIn Corporation of Mountain View, Calif., United States, sponsored content is presented to users on the user's home page, such as in the news feed, as a banner above or below the news feed, and/or in a side reel of a display of the web page, in the user's electronic mail box, on a SlideShare site, and in third party web pages that provide space through a real time bidding (RTB) exchange, among others. It can be challenging, especially on websites that display sponsored content in multiple locations and/or receive significant user traffic, to track which ads have been presented to users and have created a possible revenue generating tracking event, whether an ad campaign associated with the sponsored content has been satisfied, and other user interaction information, such as may be useful for data analytics.

For LinkedIn's social networking website, there are currently hundreds of thousands of active advertisers, over a hundred thousand active sponsored content campaigns, and millions of active creatives (ads). The website produces hundreds of millions impressions (instances in which a sponsored ad is presented on a user's display for a specified period of time) per day, and hundreds of thousands of click events (instances in which a user selects, such as by clicking with a mouse, an ad that is presented on the web page) per day. Other website hosts other than LinkedIn present sponsored content in multiple areas on their websites and face the same sponsored content tracking problems. Tracking this user interaction and ad information so as to try to minimize lost revenue due to a tracking event being lost or otherwise not billable to an advertiser is a difficult task. This same data can also be used for data analytics and can be tracked for that purpose as well. Tracking and separating analytics data from non-analytics data compounds the problem Embodiments discussed herein can provide a solution to helping track and record user interaction with content (e.g., sponsored and un-sponsored content). Some of these embodiments are termed a Targeted Sponsored Content Platform (TSCP) Tracker. The TSCP Tracker has multiple interacting components. The TSCP Tracker can provide a scalable architecture to handle increases in user traffic. The TSCP Tracker can be redundant, so as to require multiple devices to fail to cause the TSCP Tracker to fail (e.g., lose a tracking event packet or otherwise not track and record a revenue generating event such that revenue is lost). The TSCP Tracker can communicate with multiple, interacting colocation centers (sometimes referred to as data centers) so as to provide flexibility in the deployment of the Tracker and to provide faster download and tracking times. The TSCP tracker includes consolidated tracking logic, thus making maintenance and updates of the system easier than a system with distributed tracking logic. The TSCP tracker includes flexibility to extend to new applications that can be hosted on the website, such as to help present more sponsored content using the website.

The embodiments discussed herein improve upon user interaction tracking systems that include tracking logic distributed in multiple components and multiple services. In some of these distributed tracking systems, tracking events flow to different front end services and are sent through multiple paths to the backend services depending on the application from which the user interaction originated. The tracking data from the multiple paths are processed and validated in various resources and in various ways. With these distributed tracking systems it is difficult to maintain the system and support new application launches on the website. Embodiments discussed herein centralize the tracking logic and provide a unified path solution that allows an application to be launched with on the website and added to the tracking pipeline in a simple and efficient manner.

In one or more embodiments, a front end tracking client can perform fewer operations than previous distributed tracking systems that included distributed tracking logic. Such a configuration allows a simplified front end client deployment that helps in reducing maintenance costs associated with the tracking client. In one or more embodiments, more of the data processing for user interaction tracking, such as decryption, deduplication, validation, fraud monitoring and prevention, decoration, redundancy database updates, analytics database updating, and tracking event database updates, can be handled in a small number of centralized locations. The tracker and components of the tracker will now be described with reference to the drawings.

FIG. 1 illustrates, by way of example, a block diagram of an embodiment of a system 100 for tracking user interaction with content of a website. The system 100 as illustrated includes a user client 102 communicatively coupled to a tracker client 103, which is communicatively coupled to a TSCP tracker module 105.

The user client 102 provides a user with a view of a website or other application, monitors user interaction with the website, and provides tracking event data, such as in the form of a tracking event URL, to the tracking client 103. The tracking client 103 organizes the received events from the user client 102 by a partitioning scheme of a database 120, persists the organized events to the TSCP tracker 105, and provides ads to the user client 102 that are presented (and targeted) to the user. The tracking event data is provided to a tracking application logic module 116 of the TSCP tracker. The application logic module 116 deduplicates the tracking event data, transforms the tracking event data into tracking packets using an application logic plugin format, performs fraud prevention operations on the packets, and provides the data to different databases based on the content of the packets. The packets can include a unified packet format. The tracking packets are provided to a tracker module 118 that does packet level deduplication on the packets, aggregates the packets in accord with a specified partitioning scheme of the database 120 (e.g., partition by account ID), and persists the data to tables of the database 120.

Delta data writes to the database 120 are monitored by an intelligence module 130 and used to update cache tables of the intelligence module 130. These cache tables include creative-level, campaign-level, and/or account-level budget and/or performance data. Data from the cache tables can be used to update tables of the database 120 and/or tables of the database 140. The intelligence module 130 includes logic to determine if a campaign, account, or creative is to be suspended, terminated, activated, and/or re-activated. The data stored in the tables of the database 120 and/or 140 is then used to provide a bill to an advertiser that initiated an ad campaign.

The system 100, in one or more embodiments, provides a first pipeline for data corresponding to revenue generating tracking events and a second pipeline for data corresponding to non-revenue generating events. The revenue generating pipeline includes the user client 102, the tracker client 103, the application logic module 116, the tracker module 118, the intelligence module 130, an ad tracking and details module 138, and the databases 107, 110, 112, 114, 120, and/or 140. The non-revenue generating event pipeline can include the user client 102, the tracker client 103, the tracking application logic module 116, and the databases 107, 110, 112, and/or 114. Regardless of whether a tracking event is a revenue or non-revenue generating event, data from the tracking event can be recorded in the analytics database 110, such as for data mining (e.g., ad or other targeting) purposes.

The bill or results of the data mining can be provided to a user, such as by hard copy, computer-readable medium, or through a graphical user interface (GUI). Additionally or alternatively, a user can view performance characteristics, current budget levels, or other data related to user interaction with the content through the GUI, such as to find out how the campaign is performing, how much budget remains, targeting criteria that might increase the performance of the campaign, and so forth.

In general the user client 102 is a browser or other website access application loaded onto a device, such as a computer (e.g., a laptop, desktop, tablet, etc.), a smartphone, or other device with internet connectivity. The client 102 accesses content of a website by providing a request to a web server (not shown in FIG. 1), which receives the request and provides content to the client 102 in response to the request. The content can include sponsored and/or un-sponsored content. A user can interact with the content, such as by selecting the content (e.g., clicking on the content with a mouse, selecting the content with their finger on a touchscreen, providing a voice command to select the content, among others) or by being presented the content, such as for a minimum specified period of time. Selecting and being presented with the content are both types of events that can be associated with a sponsored content campaign, such as to generate revenue for the website on which the creative is displayed. An event that generates revenue is called a "revenue event" and an event that does not generate revenue is called a "non-revenue event". A user selecting the content is called a "click event" and a user being presented with content (for a specified period of time) is called an "impression event". A third type of tracking event is called a "conversion event". A conversion event is a click event with user interaction beyond just selecting the advertisement. A conversion event can include a user purchasing a product, signing up for a newsletter, filling out a survey, or filling out a form to receive more information, for example.

There can be click, impression, and conversion events that are either revenue events or non-revenue events. In some instances, not all click events generate revenue, not all impression events generate revenue, and not all conversion events generate revenue. If an event does not generate revenue, details of the event may still be recorded for data analytics purposes. If a campaign is set up to generate revenue whenever a user is presented with an advertisement for a specified amount of time, a click or conversion on the advertisement is not revenue generating, only the impression generates revenue.

The tracker client 103 receives data from the user client 102 regarding impression, click, and conversion events, all of which are generically referred to as "tracking events". The tracker client 103 manages the transmission of tracking events to the TSCP tracker module 105. In one or more embodiments, the tracking events sent from the tracker client 103 to the application logic module 116 includes a uniform resource locator (URL) that identifies a member identification (ID) (of a member of the website, described in more detail later), campaign ID, campaign type, tracking event ID, advertiser ID, cost per click, cost per impression, and/or currency type, etc.

The tracker client 103 temporarily stores the tracking data from the user client 102 in a buffer 104 (e.g., a partitioned buffer) based on a hash value returned from the hashing operation. The buffer 104 provides the accrued tracking event data stored thereon to a corresponding tracking module 108 of the TSCP tracker 105 that is assigned to handle the tracking events associated with the account IDs that hash to the specific hash value. The data from the buffer 104 can be provided to the TSCP tracker 105 in a single packet. In response to a specified buffer size being reached or a specified amount of time lapsing since the last buffer write, the buffer 104 attempts to provide the data to the application logic module 116.

If the buffer 104 is not successful in the transmission (e.g., the buffer 104 does not receive an acknowledgement that the data was received or the buffer 104 receives a request to retransmit the data or an indication that the data was not transmitted successfully (e.g., error code 400, 500, or 503 in the case of a Hypertext Transfer Protocol (HTTP) data transfer)) the data from the buffer 104 is persisted to a local persistent database 107, such as a Berkley database (BDB) from Oracle Corporation of Santa Clara, Calif., United States. The database 107 stores data and continues to retry sending the data to the tracker module 116 until it receives confirmation that the data was received or until a specified amount of time has lapsed since the data was received at the database 107. In an example in which the database 107 transmits the tracking event data in an HTTP request, the confirmation can include a code of 200. The database 107 can remove data associated with a confirmation in response to receiving the confirmation.

The tracker client 103 receives requests from the user client 102 for web page data. A backfill module 106 of the tracker client 103 requests ad data from an ad and tracking details module 138 of the TSCP tracker 105. The ad and tracking details module 138 provides an ad that can be targeted to a user associated with the user client 102 (e.g., a device with a device ID that is associated with the user client 102 or the user that is currently logged in, such as can be identified by the member ID). The ad data can be provided to the backfill module 106 of the tracker client 103 in Hypertext Transfer Protocol (HTTP) or Java Script Object Notation (JSON) format, among others, for populating a user's view of the website through the user client 102. The creative is then rendered on the user's device using the user client 102. If the creative is displayed on the screen of the device for greater than (or equal to) a specified threshold time (as can be determined by the entity paying for a sponsored content campaign) than an impression event is triggered and the user client 102 provides corresponding tracking event data to the tracker client 103. If a user selects the rendered creative, a click event is triggered and the user client 102 provides tracking event data to the tracker client 103. Note that a click event also generally includes an associated impression event. That is, if a user has clicked on the creative the creative has probably been displayed to the user for the threshold time required to create an impression event so that an impression event has also been created.

The tracker client 103 redirects, using a backfill module 106, a received click event to a webpage that displays data associated with the click event. For example, if a user clicks on a creative for an article from a news source, the tracker client 103 redirects the user client 102 to the article. As used herein, "creative" and advertisement ("ad") are used interchangeably.

The data from the user client 102 to the tracking client 103, in response to a tracking event being detected by the user client 102, includes a tracker identification (ID) to uniquely identify the tracking event, an impression ID to uniquely identify the event; an indication of the creative (i.e. ad) associated with the tracking event, the type of event (i.e. whether it was a click event or an impression event), a device ID that uniquely identifies a device that was used to provide the creative, a time at which the tracking event occurred, and/or an application from which the event originated.

In one or more embodiments, the tracker client 103 is partitioned such that there are multiple tracker clients 103 to handle requests from the user client 102. The tracker client 103 performs a hashing operation on the account ID in the tracking data (hash value=hashing operation (account ID)). The hashing operation maps data of an arbitrary size to data of a fixed size in a deterministic fashion, such that the same account ID hashes to the same hash value consistently. The hashing operation returns a number in a set of numbers that has a size equal to the number of partitions. In embodiments in which multiple partition sizes are used, multiple, different hashing operations will be required to determine which partition a particular item is a member of.

Partitioning based on the account ID helps spread the processing load among the tracker clients 103, tracking modules 108, the database 120, and budget and performance control modules 132. Assuming that the probability of serving an ad is uniformly distributed among all currently active ad campaigns the load of the items partitioned based on the account ID is evenly distributed.

A distributed item and a partitioned item are different. A partitioned item is an item that includes a division of its constituent elements into distinct parts that do not interact directly with each other. A distributed item is an item that includes multiple components interacting with each other to achieve a common goal.

Each application hosted by the website may provide some or all of the information in different formats to the tracker client 103. The application logic module 116 performs encoding on the information from the tracker client 103, such as to convert the data in a format compatible with a database 110, 112, and 114, and a tracker module 118. The database 110 is illustrated as being a network symbol because, in some embodiments, the database 110 operates offline, while the other databases 112, 114, 120, 140, and/or 107 operate online. More details regarding the application logic module 116 are discussed with regard to FIG. 2 and elsewhere.

Tracking event data from the buffer 104 or database 107 is received at the tracking application logic module 116 of the tracking module 108 of the TSCP tracker 105. An example of a data format of data provided to the application logic module 116 is provided:

```
// TrackingData
{       "type": "record",
        "name": "AdBlTrackingData",
        "namespace": "com.business.tscp",
        "doc": "Tracking data for TSCP tracker's business layer. Business layer will contain validation logic and deduplicating logic, but may not directly talk to DB".
        "fields": [
          { "name" : "id",
            "doc" : "The unique identifier for this tracking event, generated by UUID",
            "type" : "com.common.UUID" },
          { "name" : "trackingAction",
            "doc" : "Tracking action to perform",
            "type" : "com.tscp.internal.tracking.TrackingDataType" },
          { "name" : "trackedAt",
            "doc" : "The time when tracking happens",
            "type" : "com.common.Time" },
          { "name" : "trackingUrl",
            "doc" : "URL of tracking information, including the id of member.
            campaign, tracking event, advertiser, cost per click, cost per impression,
            currency, etc.",
            "type" : "com.business.common.Url" },
          { "name" : "status",
            "doc" : "The status of tracking event",
            "type" :
            {  "name" : "TrackingStatus",
               "type" : "enum",
               "symbols" : ["COMPLETED", "PROGRESSING"] },
            "default" : "PROGRESSING"
          } ]
}
```

The tracking application logic module 116 provides a plug-in capability to add application logic to, or remove application logic, from the tracking event pipeline (from tracking event creation at the user client 102 to data being provided to the ad and tracking details module 138 by a database 140). The tracking event data from the buffer 104 indicates an application from which the tracking event originated or the format of the data can indicate which application the tracking event originated from. Since a website can provide access to many applications, and each application can have its own data format and/or tracking rules, the data from one application may be re-formatted, interpreted, or otherwise operated on different than data from another application. The application logic module 116 performs re-formatting and interpreting operations on the data and transmits the re-formatted data to items of the system 100, such as an analytics database 110, a frequency capacity database 112, a deduplication database 114, and/or the tracker module 118. The item(s) which receive the data from the application logic module 116 is determined based on the creative, type of event, whether the event is a revenue generating event, and/or an application from which the tracking event originated. The application logic module 116 creates event packets (e.g., in a unified packet format) to the tracker module 118. More details regarding the application logic module 116 are provided with regard to FIG. 2.

The database 110 is an analytics database that stores data relevant to (generally offline) data mining. Data mining is another avenue for revenue generation using data gathered from tracking user interaction. Data Mining is an analytic process to explore data for consistent patterns and/or systematic relationships between variables, and then to validate the findings by applying the detected patterns to new subsets of data. Predictive data mining uses the findings to predict a user or subset of users that would most likely be interested in a topic, for example. This type of data mining is useful for targeting, which can help increase the performance of a specific creative in an ad campaign The database 110, in one or more embodiments, includes an Apache Kafka system from Apache Software Foundation, Delaware, United States. The database 110 can be partitioned by advertiser ID (sometimes referred to herein as account ID). Note that a single advertiser can have multiple campaigns, thus a single advertiser ID can be associated with multiple account IDs.

The database 112 is a redundancy database that stores data regarding which creatives have been served to each user, the entity associated with each of the creatives, and a time at which each of the creatives was served. The database 112, in one or more embodiments, is a key-value store. In one or more embodiments, the database 112 is a Voldemort database from LinkedIn Corporation.

In one or more embodiments, the ad and tracking details module 138 can limit the number of creatives that are served to a specific user from the same entity, such as in a specified amount of time. For example, a policy can be defined and enforced (by the ad and tracking details module 138) that a user can only receive three creatives associated with the same entity in a 48 hour period. Each entity may have multiple sponsored content campaigns and one or more creatives for each campaign, so a user can be exposed to many same or similar creatives if the frequency check is not in place. Such redundancy checks help reduce user frustration in using the website.

The deduplication database 114 is a deduplication database accessible by both the tracking application logic module 116 and the tracker module 118. The deduplication database 114 includes tracking event data, such as can include tracking event URLs stored thereon. The URLs do not necessarily point to a resource in the traditional manner of a URL. The URLs are a convenient way to store tracking event data, since a web request typically includes a URL. The deduplication database 114 includes entries that identify tracking event IDs and a number of times each tracking event ID has been through the tracking pipeline (in a specified amount of time) and packet IDs and a number of time each packet ID has been through the tracking pipeline. In one or more embodiments, the application logic module 116 and tracker module 118 include logic that determines if a tracking event or packet is a duplication of a tracking event or packet that has already been through the pipeline by comparing the data from the database 107 or buffer 104.

The application logic module 116 and/or tracker module 118 can perform an increment operation by the tracking ID or the packet ID, and the database 114 returns a value indicating the number of times that tracking ID or packet ID has been through the pipeline in a specified amount of time. If the returned value is greater than (or equal to) a configurable threshold value, then the event is a duplicate and is removed from the pipeline or marked as invalid. In one or more embodiments, the deduplication database 114 is a Couchbase Server from Couchbase, Inc. of Mountain View, Calif., United States, such as can be deployed as a distributed cache.

Figure 2:
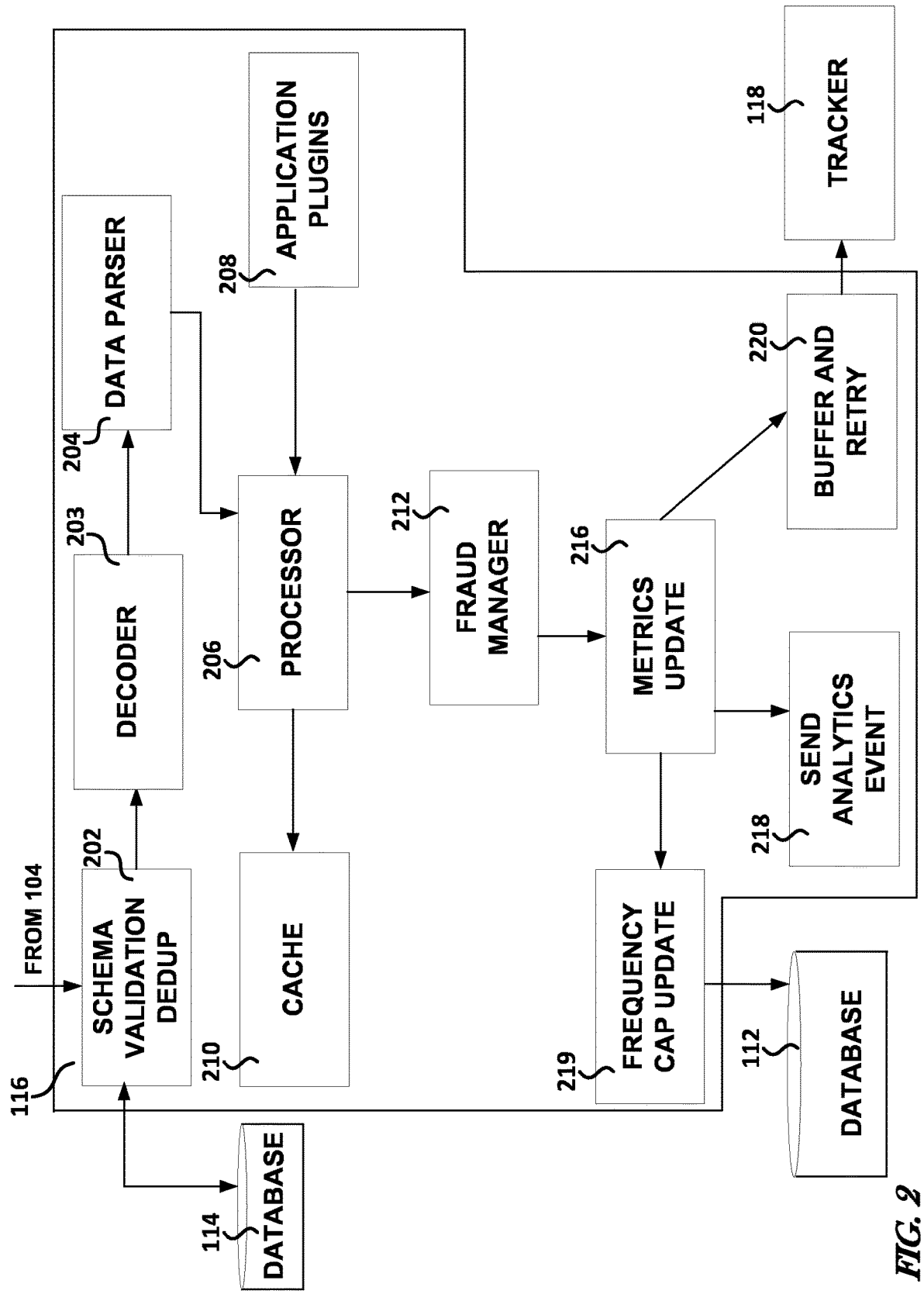
FIG. 2 illustrates, by way of example, a block diagram of an embodiment of an application logic module and peripheral devices with which the application logic module communicates.

The tracking application logic module 116 as previously discussed is described in more detail with regard to FIG. 2. In one or more embodiments, the application logic module 116 is partitioned by account ID such that each application logic module 116 only receives tracking events associated with one or more specified account IDs. A module being partitioned means that there are instances of the module that serve a particular one or more partitions of a database. In embodiments in which the database is partitioned by hashing on account ID, there are one or more instances of the module to serve each partition and a module that serves one partition does not serve another partition.

The tracker module 118 deduplicates tracking events, aggregates tracking events for writing to a database 120 and/or 110, and persists the tracking event data to the database 120 and/or 110 in case of a write failure. More details regarding the tracker module 118 are provided with regard to FIG. 3.

The database 120, in one or more embodiments, is a horizontally scalable document-oriented data store. In one or more embodiments, the database 120 is partitioned by account ID. The database 120, in one or more embodiments is an Espresso database from LinkedIn Corporation. The data in the database includes one or more stats tables 122, creative tables 124, campaign tables 126, and account tables 128. The stats tables 122 can include creative level stats, campaign level stats and account level stats. The stats tables 122 can be for one or more time granularities, such as daily, weekly, monthly, yearly, and/or lifetime. The stats in the stats tables can include a click-through rate, an urgency, and/or an impressions per day.

Figure 5:
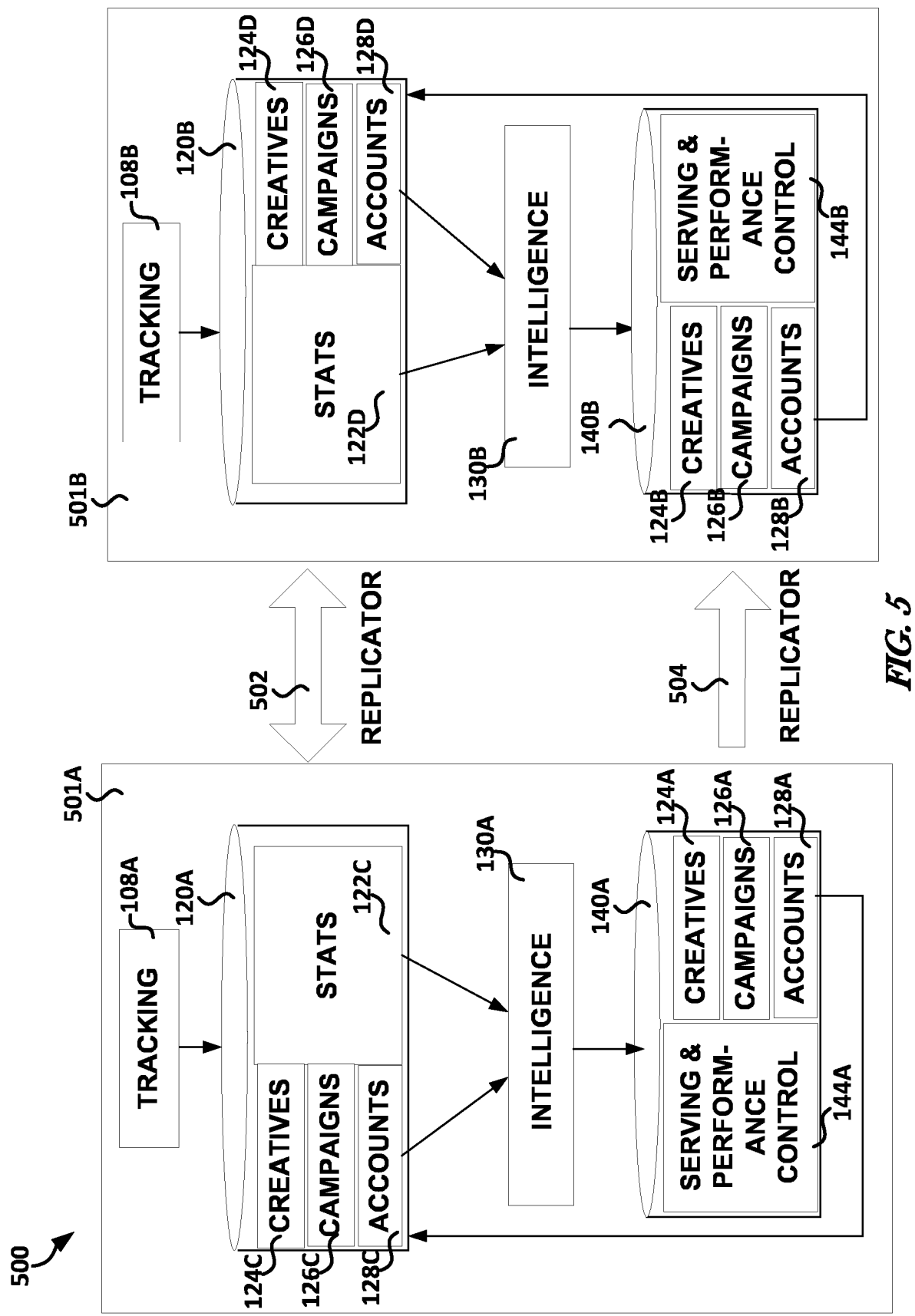
FIG. 5 illustrates, by way of example, a block diagram of an embodiment of a system (e.g., sub-system) for multicolo replication.
Figure 6:
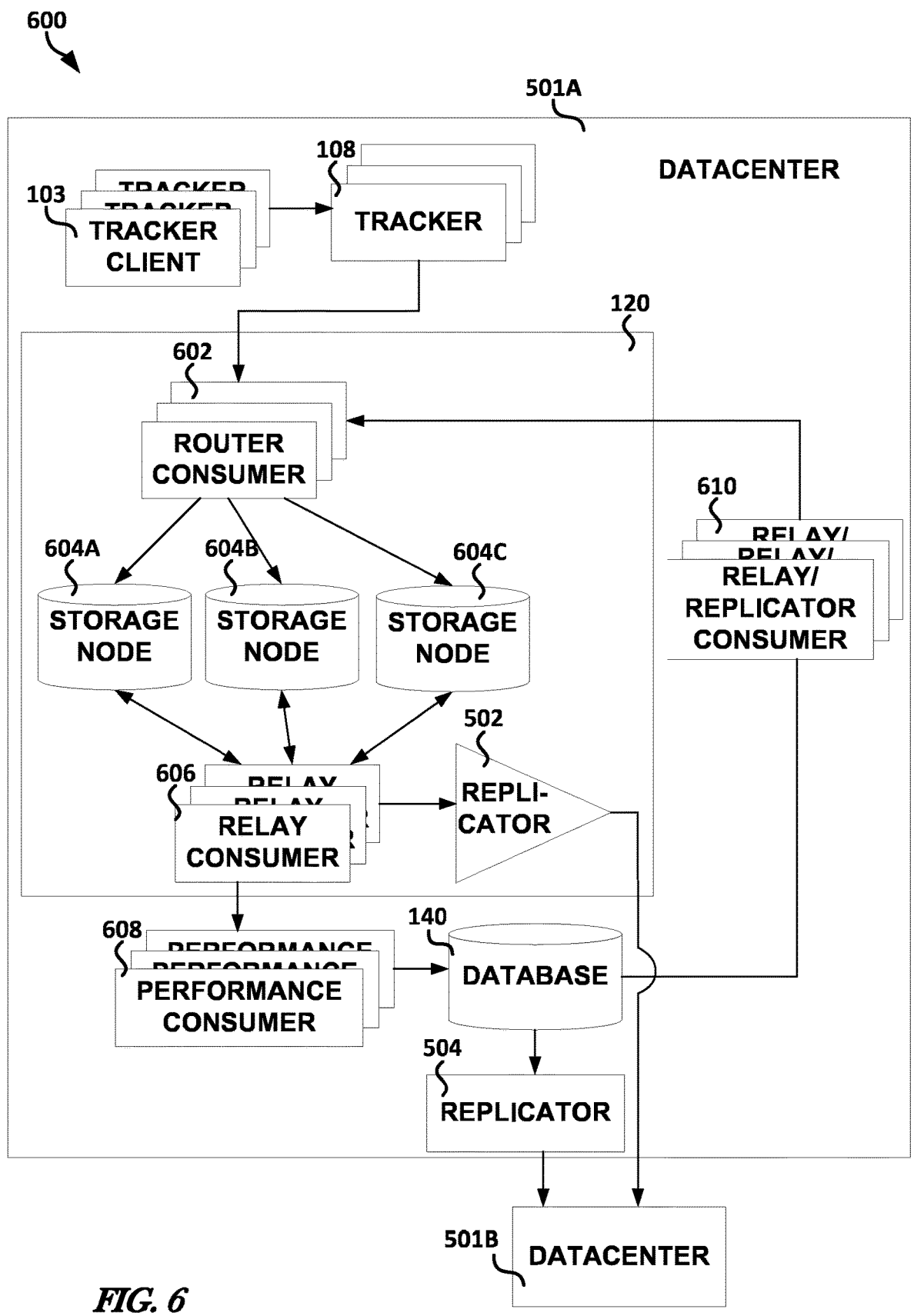
FIG. 6 illustrates, by way of example, a flow block diagram of an embodiment of a more detailed view of items of the system of FIG. 5.

Each stats table in the database 120 can include a colo ID that indicates a data center from which the data originated (see FIGS. 5 & 6 for a depiction of the datacenters (e.g., colos)). A "colo" is shorthand for colocation center. This colo ID helps in data replication across data centers, which is discussed in more detail with regard to FIGS. 5 and 6. The campaign and account tables 126 and 128 can include data indicating daily, monthly, and lifetime budgets for the campaign and the account. The creative table 124 can include a revenue associated with presenting the creative, a bid price associated with bidding on an RTB exchange, a number of times the creative has been presented/selected, a campaign ID that indicates a campaign with which the creative is associated, an account ID that indicates an account with which the creative is associated, a time associated with the tracking event, targeting data, and so forth. An entry of the campaign table 126 can include data from entries of the creatives table 124 corresponding to the campaign ID of the campaign. More details regarding possible contents of the tables 124, 126, and 128 are provided with regard to the database 140. Some of the data in the database 120 is provided by the tracking module 108, other data in the database 120 is provided by an intelligence module 130, and yet other data in the database 120 is provided by a replicator module 142. Data from the tables 122, 124, 126, and 128 can be provided to and stored on the ad and tracking details module 138 and/or the database 140.

The system 100 as illustrated includes an intelligence module 130 that receives data corresponding to updates (e.g., delta writes) to the database 120. The module 130 includes a budget and performance control module 132 that processes the data updates from the database 120. The budget and performance control module 132 can determine if a campaign or account budget has been used up and is to be terminated (or suspended) or if an account or campaign is to be suspended.

The intelligence module 130 is illustrated as including a partition module 134. The partition module 134 manages the mapping of partitions of the database 120 to partitions of the budget and performance control module 132. The partition module 134 performs load balancing, such as to distribute the work load among the budget and performance control modules 132 or redistribute the workload if a partition of the performance control module 132 is overloaded. The partition module 134, in one or more embodiments can be implemented using an Apache Helix cluster management framework from the Apache Software Foundation.

The module 130 can be partitioned by account ID or some other partition scheme, such as can be determined by the partition module 134. In one or more embodiments the module 132 includes databus consumers feeding data thereto. In one or more embodiments, the databus consumers are partitioned by advertiser ID such that each databus consumer is dedicated to a single partition of the database 120 associated with the same hash value(s). In one or more other embodiments, the databus consumers are partitioned such that each consumer serves multiple partitions of the database 120. A databus consumer is an object that implements an application programming interface (API), listens to a stream of data events (to the database 120), and performs operations on the data in the data stream. The budget and performance control module 132 receives the delta events and/or the results of operations performed by the consumer(s), stores some of the received data, and perform calculations about budget-related and performance-related metrics of campaigns and accounts. The intelligence module 130 writes the results of the calculations to the database 120 and/or 140, such as to update the table(s) 122, 124, 126, and/or 128.

The budget and performance control module 132 is partitioned in accord with the partitioning determined by the partition module 134. In one or more embodiments, the partitioning of the budget and performance control module 132 includes fewer partitions than the number of partitions of the database 120. In these embodiments, each budget and performance control module 132 serves multiple partitions of the database 120. In one or more embodiments, each partition of the database 120 is served by one master consumer and one or more standby consumers (i.e. partitions of the budget and performance control module 132). The partition module 134 manages the assignment of partitions of the database 120 to consumers of the module 132. The module 134 manages election of a master consumer for each partition. The standby consumers are for backup purposes and are replicas of the master (to a certain point in time), such as to help perform operations if the master is not able. In one or more embodiments, for each master consumer there are two slave (backup or standby) consumers.

Tracking event writes to the database 120 can be buffered by the database 120 and passed to the intelligence module 130 (e.g., by the databus consumers) in a batch. The buffer of data can be offloaded to the intelligence module 130 in response to the number of buffered tracking events in the database exceeding a specified number of transactions or a specified time interval elapsing. The budget and performance control module 132 can use the data written thereto to update one or more cache data tables of the budget and performance control module 132, see FIG. 4 for an example depiction of some of the cache data tables.

The budget and performance control module 132 uses the data from the database 120 to monitor how the budget for a campaign or account has been used, so that if a campaign or an advertiser budget has been used up, then the campaign or the advertiser's campaigns will be marked so that it will not be served, such as by the ad and tracking details module 138. Daily, monthly, and/or lifetime budget controls can be implemented with the help of the budget and performance control module 132. If a daily, monthly, and/or lifetime budget of a campaign or account is determined to be used up, the budget and performance control module 132 marks the campaign and/or corresponding account as complete, such that ads in that campaign or account are no longer served. The budget and performance control module 132 can, each day, set the daily budget level of a campaign to a remaining lifetime budget of the campaign. In such embodiments, a campaign can stop being served after the daily budget is reached.

The budget and performance control module 132 can maintain the budget and costs for day/month/lifetime time periods at campaign and/or advertiser levels, and mark campaign as completed for the day or totally completed in response to the budget and performance control module 132 determining a budget level has been reached. The following in-memory maps (stats cache maps) of the budget and performance control module 132 can help perform the budget monitoring operations:
1. campaignStatsMap: <campaignId, campaignStats>
2. advertiserStatsMap: <advertiserId, advertiserStats>
3. campaignInfoMap: <campaignId, campaignInfo>
4. advertiserInfo Map: <advertiserId, advertiserInfo>
campaignStats can include: dailyCostMap <day, cost>; monthlyCostMap <month, cost>; lifetimeCost;
advertiserStats can include: dailyCostMap <day, cost>; monthlyCostMap <month, cost>; lifetimeCost;
campaignInfo can include: dailyBudget, monthlyBudget, lifetimeBudget
advertiserInfo can include: dailyBudget, monthlyBudget, lifetimeBudget Using such in-memory stats maps, the intelligent module 130 can listen for events on the database 120 and update both maps, such as in one transaction, in response to receiving an event that corresponds to the campaignId, creativeId, and/or advertiserId. To maintain the info maps, The intelligence module 130 listens for events from the database 140 and updates the campaignInfo/advertiserInfo maps in response to receiving an event that corresponds to the campaignId and/or advertiserId of the map.

In one or more embodiments, the budget and performance control module 132 receives tracking event data from the database 120 and updates both campaignStatsMap and advertiserStatsMap. The budget and performance control module 132 then performs the budget control calculations, by for example comparing campaignStats and accountStats with campaignInfo and advertiserInfo to determine if any of the daily, monthly, and/or lifetime budgets has been used up and consequently if a status of any of the campaigns or accounts is to be updated. In response to determining the status is to be updated, the budget and performance control module 132 can update a status of a campaign table of the database 140. In response to processing a batch of events from the database 120, the budget and performance control module 132 can update a partition table in the database 140 to include a new batchNumber corresponding to the latest batch of processed tracking events. In response to receiving a confirmation from the database 140 that the update to the table(s) has been received and/or processed, the budget and performance control module 132 can update an entry in a coordinator module 136. In one or more embodiments, the coordinator module 136 includes an Apache Zookeeper from the Apache Software Foundation to help perform its functionality. The update to the coordinator can identify a partition of the intelligence module 130 (e.g., a partionNumber) corresponding to the last successful update and a batchNumber corresponding to the data that was last provided to the database 140.

The budget and performance control module 132 can make decisions on performance control. The budget and performance control module 132 can look into user interaction stats (time user viewed, clicked on, click through rate, urgency, mentioned, etc.) and if a creative of a campaign is performing poorly (for example) the budget and performance control module 132 can shut down that ad (by setting a status bit of that creative) and just serve the remaining ads of the campaign. In such embodiments, more resources are freed up to serve other campaigns or ads of this campaign. In one or more embodiments, the budget and performance control module 132 can determine if an urgency of the campaign or creative is greater than a specified, configurable, threshold. In response to determining the urgency is greater than (or equal to) the threshold, the budget and performance control module 132 can determine if one or more ads of the campaign are performing more poorly than other ads of the campaign and terminate ads that are determined to be performing poorly. An ad can be determined to be performing poorly based on a click through rate, impressions or clicks per day, or other performance metric.

The partitionNumber and the batchNumber can be used to help in the case of a failover scenario, such as a partition of the budget and performance control module 132 becoming inoperable or another partition of the budget and performance control module 132 being added. If a partition of the budget and performance control module 132 is inoperable, another partition of the budget and performance control module 132 will be assigned to consume the events from the database 120, such as by the partition module 134. A partition of the budget and performance control module 132 that is brought online (as a new partition or to perform operations in place of a module that has become inoperable) can take over the worked performed by the partition from the previous instance, and start consuming tracking events from the last saved batchNumber.

An operation performed by the budget and performance control module 132 can be triggered by a tracking event buffer in the database 120 including a specified number of records or a specified time interval elapsing. Each buffer of events from the database 120 can include a partition ID as well as a corresponding batchNumber. Note that, if a campaign was marked as being complete for one day is not necessarily complete for following days. For example, a campaign can include a not-to-exceed daily budget and a lifetime not-to-exceed budget. In this example, the campaign can be completed for a day without having exhausted the entire lifetime budget. Thus, the campaign can be a viable candidate for serving ads the next day, but include campaign status information that indicates that the campaign is completed, because the daily budget for the previous day was exhausted. A similar situation can occur for a campaign with a monthly budget. A campaign that includes a campaign status of complete for a previous day (or month) will not be served for the current day without some logic to check to see if the status information is accurate and reset the status information if the campaign status is not accurate for the current day. To help alleviate this issue, the budget and performance control module 132 can determine if a campaign status indicates the campaign is completed for the day and a cache table indicates that the lifetime budget of the campaign has not been used up, such at or near a beginning of each serving day. The budget and performance control module 132 (or a separate dedicated thread) can check if the current day has changed, and if yes, the module can check for campaigns that are not completed for their lifetime, but were completed for the previous day and reset the daily status of those campaigns. Similar operations can be performed to determine if a campaign has been satisfied for a previous month, but includes more lifetime budget to be used up. The check to determine if the day or month has changed can be performed periodically, such as at specified time intervals. If the day/month has changed, the status of each campaign and budget of each campaign can be analyzed (as described) to determine if the status of the campaign is to be changed.

Each partition of the budget and performance control module 132 can include an in-memory cache that includes a plurality of cache tables stored thereon. The cache can include a concurrent hashmap of campaign-level and/or creative level stats and/or performance data. Each CampaignStats object in the hashmap can include: a stats delta object containing delta changes since last CTR/urgency/impressionsPerDay calculations for this campaign; a stats object that aggregates active creatives stats across all data centers in the last CTR/urgency/impressionsPerDay calculations. Each creativeStats object in the hashmap can include: a dailyStatsByDay map containing a specified number of days of the creative-level stats for each data center and a monthlyStatsQueue containing a specified number of the creative-level stats aggregated across all data centers. CTR stands for click through rate. IPD stands for impressions per day.

A hashmap is a data structure that provides associative array capability. The structure can map a key to a value based on a hashing function. The hashmap uses the hash function to compute an index into an array of buckets in which a value is stored and can either be overwritten or retrieved.

After the budget and performance control module 132 processes a configurable number of event batches, for each partition served by each consumer, the cache content changes can be transferred to the database 140 and/or 120. Note that the partitioning scheme of the following example data formats includes budget and performance control module 132 partitioned by partitionID as managed by the partition module 134, which may or may not be the same partition scheme as the database 120. Examples of data formats for data stored in the cache are provided:

```
{
"schemaType": "TableSchema",
"name": "CampaignStatsCacheBatchNumber",
"version" : 1,
"recordType": "/schemata/document/TSCP/CampaignStatsCacheBatchNumber",
"resourceKeyParts":
[{"name": "partitionId", "type": "LONG"}]
}
{
"schemaType": "DocumentSchema",
"type": "record",
"name": "CampaignStatsCacheBatchNumber",
"version": 1,
"fields" : [{"name": "lastBatchNumber", "type": "long"},
{"name": "creationTime", "type": "long"},
{"name": "lastUpdateTime", "type": "long"}]
}
{
"schemaType": "TableSchema",
"name": "CampaignStatsCache",
"version" : 1,
"recordType": "/schemata/document/TSCP/CampaignStatsCache",
"resourceKeyParts":
[{"name": "partitionId", "type": "LONG"}
{"name": "campaignId", "type": "LONG"}]
}
{
"schemaType": "DocumentSchema",
"type": "record",
"name": "CampaignStatsCache",
"version": 1,
"fields" : [{"name": "cacheData", "type": "string"},
{"name": "creationTime", "type": "long"},
{"name": "lastUpdateTime", "type": "long"}]
}
```

The cacheData, in one or more embodiments, can include a JSON object containing one or more of the following advertiserId, campaignType, dailyBudget, activeStatus, deltaImpressions, deltaConversions, deltaClicks, deltaCost, totalImpressions, totalConversions, totalClicks, totalCost, and/or a list of creative stats. A creative stats object in the cache can include one or more of the following a creativeId, activeStatus, an array of month_stats, and/or an array of daily_stats. Each month_stats can include an object including one or more of startDate, endDate, numImpressions, numConversions, numClicks, and/or cost. Each daily_stats can include an object including one or more of a day, coloId, numImpressions, numConversions, numClicks, cost.

When shutting down a partition of the budget and performance control module 132 (e.g., during rolling deployment), the partition of the budget and performance control module 132 can finish processing the current event batch from the database 120, transfer the cache changes to the database 120 and/or 140, and provide a last processed batch number to the coordinator module 136 and/or the database 120 and/or 140. When starting a partition of the budget and performance control module 132, the partition of the budget and performance control module 132 can fetch the last processed batch number for each partition that this module will serve, and the newly live partition can start consuming from those batch numbers. When a tracking event arrives at the budget and performance control module 132 and a campaign or creative is not present in the stats cache of the budget and performance control module 132, the budget and performance control module 132 can fetch current data for the campaign or creative from the database 120 and/or 140 and update the cache tables accordingly.

The coordinator module 134 manages partitioning of the budget and performance control module 132. The coordinator module 134 handles a partition map that determines which account IDs are associated with which partition of the budget and performance control module 132. The coordinator module 134 can adjust the partition map in response to a partition of the budget and performance control module 132 being inoperable, an instance of the budget and performance control module 132 being added to the partitions, or a workload balance of the partitions of the budget and performance control module 132 not being sufficiently evenly distributed. The module 134 routes the data from the database 120 to the proper partition of the budget and performance control module 132 based on the partition map. The coordinator module 134 also provides information to a partition of the budget and performance control module 132 that comes online. The coordinator module 134 can fetch the batchNumber for each of the partitions of the database 120 that the partition of the budget and performance control module 132 is to handle. That partition of the budget and performance control module 132 can then initialize the data stored thereon to a point corresponding to the batchNumber just prior to the batchNumbers received and begin consuming events beginning with the batchNumbers received.

The ad and tracking details module 138 chooses a creative based on a number of times the creative has previously been presented to the user, the creative's relevance to the user (targeting), the performance of the creative in terms of click through rate or impressions per day, and/or other criteria. For example, the ad and tracking details module 138 can determine that the user is a thirty-five year old female software developer and choose an ad that fits that targeting criteria or at least does not conflict with the attributes of the user. The ad and tracking details module 138 can filter multiple returned ads by comparing, for example, CTR and IPD of the ads and choosing the ad with the best historical performance. The ad and tracking details module 138 can additionally or alternatively consider an urgency of completing a campaign in choosing an ad to be served. The urgency of completing a campaign is generally a number of tracking events to be created to satisfy the campaign divided by the amount of time given to complete the campaign. A larger urgency indicates a greater need to serve ads from that campaign to satisfy the requirements of the campaign. The ad and tracking details module 138 can tend to serve ads from campaigns with greater urgency, such as to help satisfy campaigns prior to the expiration of the campaign end date.

The ad and tracking details module 138 can additionally or alternatively consider a frequency cap in serving an ad. The frequency cap can be determined by incrementing an entry in the database 112 prior to serving an ad. If a value returned form the increment operation is greater than a specified frequency cap, then the ad is not served and another ad is selected.

The database 140 can include the creative table 124A, campaign table 126A, and account table 128A, such as can represent replicas of the tables 124, 126, and 128, respectively or updated versions of those tables, such as can be updated by the intelligence module 130. Those updates to the table 124, 126, and 128 may also be provided to the database 120. The database 140 can include tracking performance and control tables 144. The tracking and performance control tables 144 can include a campaign table and a partition table. An example of the data stored in these tables is provided:

1. Campaigns table: campaignId, completion_for_day, status
2. Partition table: partitionNumber, batchNumber The partition and campaign tables can be updated in one transaction by the intelligence module 130. If the campaigns table does not need to be updated, then a write can be performed to only the partition table, such as to update the batchNumber. Either the database 140 or the module 130 can perform operations for campaign expiration control. In embodiments in which the database 140 performs the campaign expiration control, the operations can be performed by a SAS® in-database processor from SAS Institute, Inc. of Cary, N.C., United States.

The campaign expiration control can include one or more of the following operations: (1) fetch from the database 140 the paused campaigns (completion_for_day=1, for example); (2) determining if any budget is left on the campaign (lifetimeBudget >0, for example); (3) re-initiating the paused campaigns with remaining lifetime budget (setting completion_for_day=0 or setting status to indicate the campaign is still active (e.g., status=1); and (4) for advertisers who have enabled end of campaign emails, send emails to advertisers where there is no remaining lifetime budget.

The serving and performance control table 144 can include performance stats for a campaign, such as can be stored in the stats table 122 and/or used by the ad and tracking details module 138 to determine which ad of a plurality of ads to serve to a user. In one or more embodiments, an email to the advertiser can include data from the serving and performance control table 144 and/or stats table 122. The performance stats can include a number of clicks in the campaigns for a specified time interval (e.g., the last week, month, year, custom, etc.), a click through rate (CTR) for the ads in the campaign, default values for minimum and average CTR and/or minimum impressions for CTR; total number of impressions and/or conversions or clicks across all active creative of a campaign; a minimum creatives/time period expected for the campaign; number of tacking events needed to fulfill the campaign; end date of the campaign; last update date of a creative or campaign; daily budget of campaign; and impressions per day of the campaign.

The data can be used to calculate a campaign-level CTR, a creative-level CTR, a campaign-level urgency, and/or impressions per day at the creative or the campaign level. A campaign type can be used to determine whether to use impressions, clicks, or conversions in a calculation. For example, if a campaign is a click campaign, clicks are used in the CTR calculation and if a campaign is a conversion campaign, then conversions are used in the CTR calculation. In determining the campaign-level CTR the campaign type, default for minimum CTR, default for average CTR, and/or minimum impression for CTR can be used. In determining a creative-level CTR the expected campaign CTR can be used for pro-rating the creative CTR when the number of impressions for a creative is below a minimum number of impressions specified, a campaign type, default for minimum CTR, default for average CTR, and/or minimum impression for CTR, and/or a total number of impressions, conversions, or clicks for the creative over the specified time interval (or up to a last update date of the creative, whichever comes first) can be used. In determining a campaign-level urgency a campaign type, total number of impressions, clicks, or conversions needed to fulfill the campaign, total number of impressions, clicks, or conversions across all active creatives of the campaign over the specified time interval or up to each creative's last update date (whichever comes first), and/or end date of the campaign can be used. In determining a campaign-level impressions per day a total number of all creative impressions in the campaign (whether the creative is currently active or inactive) for the specified time interval is divided by the size of the specified time interval. In determining a creative-level impressions per day, the following formula can be used: ImpressionsPerDay= $(CTR_j)^2$*campaign-level impressions per day/$\Sigma_{i=1}^{N}(CTR_i)^2$, where the ImpressionsPerDay is for the jth creative of a campaign with N creatives.

The replicator module 142 listens for changes to one or more tables in the database 140 and applies or replicates the changes to the database 120. The replicator module 140 can include one or more databus consumers. The tables to be applied or replicated to the database 120 can include the accounts table 128A, the campaigns table 126A, and/or the creatives table 124. A Examples of data in each of these tables can include:
Accounts: advertiser_id, daily_budget (original daily_spending_limit), status
Campaigns: campaign_id, advertiser_id, campaign_type, daily_budget, total_budget, status, on_account_hold, completion_for_day
Creatives: creative_id, campaign_id, advertiser_id, status, last_update_time, on_account_hold

```
{
"schemaType": "TableSchema",
"name": "Accounts",
"version" : 1,
"recordType": "/schemata/document/TSCP/Account",
"resourceKeyParts":
[{"name": "accountId", "type": "LONG"}]
}
{
"schemaType": "TableSchema",
"name": "Campaigns",
```

-continued

```
"version": 1,
"recordType": "/schemata/document/TSCP/Campaign",
"resourceKeyParts":
[{"name": "accountId", "type": "LONG"}
{"name": "campaignId", "type": "LONG"}]
}
{
"schemaType": "TableSchema",
"name": "Creatives",
"version": 1,
"recordType": "/schemata/document/TSCP/Creative",
"resourceKeyParts":
[{"name": "accountId", "type": "LONG"}
{"name": "campaignId", "type": "LONG"}
{"name": "creativeId", "type": "LONG"}]
}
```

FIG. 2 illustrates, by way of example, a block diagram of an embodiment of the application logic module 116. The application logic module 116 performs application specific operations (application logic) on data from the tracker client 103 or the persistent database 107 to transform the data into tracking packets compatible with the database 120, the analytics database 110, and/or the redundancy database 112. The application logic module 116 can be implemented as a client, library, or service.

The application logic module 116 as illustrated includes a schema validation deduplication module 202 communicatively coupled to a decoder module 203 that is communicatively coupled to a data parser module 204. The application logic module 116 includes a processor 206 communicatively coupled to the data parser module 204, an application plugins module 208, a cache memory 210, and a fraud manager module 212. The application logic module 116 as illustrated includes the fraud manager module 212 communicatively coupled to a metrics update module 216. The metrics update module 216 is illustrated as being communicatively coupled to a buffer and retry module 220, a send analytics event module 218, and a frequency capacity update module 219. The frequency capacity module 219 is communicatively coupled to the redundancy database 112. The buffer and retry module 220 is illustrated as being communicatively coupled to the tracker module 118.

The schema validation deduplication module 202 does deduplication of event data received. In one or more embodiments, the schema validation deduplication module 202 can be implemented by accessing or incrementing data on the database 114. The schema validation deduplication module 202 can determine if a specified number of tracking events include the same tracking event ID or impression ID and delete (or mark as invalid) a tracking event that includes a value associated therewith that if greater than (or equal to) a specified threshold number. The schema validation deduplication module 202 can determine if multiple events including different tracking event IDs are likely associated with the same tracking event and delete (or mark as invalid) an event if it is determined that the event is likely a duplicate (or has been recorded more than a specified number of times). For example, consider first tracking event data with a creative ID, a device ID, and an application ID that is the same as a second tracking event, but includes a different tracking event ID. The schema validation deduplication module 202 can determine that these events are related to the same tracking event and delete either of the first or second tracking event data, so as to make the records more accurate. In one or more embodiments in which the database 114 is a Couchbase Server, an increment operation can be performed on the tracking event ID. If the return value from the increment operation exceeds the specified limit, the event is a duplicate and is removed from the pipeline or marked as invalid. Each operation can include a time to live (TTL) so that the database 114 does not become full.

The decoder module 203 decodes data. Since data sent over the web is typically encoded, it can be helpful to decode data sent over the web into a format that is used by the processor 206. The processor 206 reformats the data received into tracking packets and adds a packet ID to the data that indicates (uniquely) the packet.

The data parser module 204 parses decoded data into its constituent components for the processor 206. The processor 206 determines which application the tracking event is associated with and retrieves corresponding application specific processing information form the application plugins module 208. The processor 206 then performs operations on the data based on the processing information from the application plugins module 208. Application plugins can include separate click/conversion event processing and impression event processing for each application supported by the website. For example, an electronic mail application can include two plugins an impression event processing plugin and a click event processing plugin and a social networking application can similarly include two plugins, one for impression event processing and the other for click event processing, thus having four plugins for two applications. Another example of an application plugin includes a real time bidding (RTB) plugin that details actions to be taken in response to receiving URLs from an RTB exchange at the tracker client 103.

The application plugins are application or product specific, but each plugin determines if a tracking event is a chargeable tracking event (an event that is associated with an active sponsored content campaign). If the event is chargeable (sometimes referred to as a revenue generating event), the tracking data is forwarded to the buffer and retry module 220 for forwarding to the tracker module 118, unless the fraud module 212 determines the tracking event is fraudulent. Regardless of the whether the event is chargeable, the event is forwarded to the persistent buffer 107 (not shown in FIG. 2) for forwarding to the analytics database (not shown in FIG. 2).

The fraud manager module 212 determines if tracking data (e.g., a tracking URL) is likely from a bot interaction (a non-person user or a user associated with a fraudulent account, an account that is not created by the entity to which the account most closely relates) and removes or marks as invalid any data from the tracking pipeline associated with an event that is determined to be fraudulent. The fraud manager module 212 can compare a member ID in the tracking data received at the fraud manager module 212 to a list of member IDs determined to be associated with such bots to determine if the tracking data is fraudulent. Not all accounts on a social networking site are created manually by human beings. Some accounts are created by either people who are not who the account says they are or are created by bots that mine profiles for user information and automatically create profile pages. When a user account that is determined to be associated with a bot is detected, it is not known whether there was an actual user viewing the web page. Thus, the tracking event may not be associated with a valid impression or click event, since an actual user may not have clicked on or been presented with the ad and the event can be removed from the tracking pipeline. Tracking events that are not determined to be fraudulent by the fraus manager module 212 can be provided to the metrics update module 216.

The metrics update module 216 provides data to a send analytics event module 218, a frequency cap update module 219, and a buffer and retry module 220. The data provided to each of the modules can include performance and budget data, or other metrics data.

The send analytics event module 218 is communicatively coupled to an analytics event database, such as the database 110 (e.g., an Apache Kafka system from the Apache Software Foundation of Delaware, United States). The send analytics event module 218 formats the data in a format compatible with the database 110 and buffers events so as to reduce the number of writes to the database 110.

The frequency cap update module 219 formats the data in a form compatible with the database 112 that records the tracking event and the number of times the ad associated with the tracking event has been presented to the user and writes the tracking event data to the database 112. The database 112 is accessible by the ad and tracking details module 138. The ad and tracking details module 138 is responsible for populating a user's view of the web page with sponsored content. The ad and tracking details module 138 can read data in the database 112 to determine how many times and/or in what time frame a user has been presented with a particular creative. The ad and tracking details module 138 can refrain from presenting a creative that has been presented to a user a specified number of times and/or in a specified time window. Such a set up provides the ability to reduce the number of times the same creative is presented to a user and in turn increase the user experience in visiting the website.

Having the frequency cap update module 219 on the tracking side (all items in the TSCP tracker module 105 are considered the tracking side or the "back end" and the rest of the items are considered the client side or the "front end") allows for more accurate ad tracking than having the frequency cap update module 219 on the client side. This is because serving an ad (e.g., a creative) does not always result in an impression or a click event. The ad can be displayed on the screen for less than an amount of time required to create an impression event, the user may not have scrolled through the web page to cause the ad to be displayed, or some other reason. Thus, only recording ad events at tracking time can be more accurate than at serving time. Also, having the frequency cap update frequency cap update module 219 on the tracking side centralizes the logic and simplifies maintenance of the frequency cap update module 219.

In one or more embodiments, the database 112 is implemented so as to provide local availability of recent ad serving history in a local cache, such as on the ad and tracking details module 138, and providing remote availability for longer ad serving history in a remote database. The local cache can be used to help enforce frequency cap policies defined for a short period of time (e.g., less than (or equal to) one minute). In instances in which the ad and tracking details module 138 is partitioned by member ID, the local cache is updated, such as by the frequency cap update module 219, if a tracking event includes a member ID (sometimes referred to as user ID) corresponding to the member ID of the partition of the ad and tracking details module 138. The ad and tracking details module 138 can then use the local cache to determine if the ad being served violates any of the short time span serving policies prior to serving an ad. The remote database can be used to enforce policies defined for a longer period of time (e.g., greater than (or equal to) one minute.

In one or more embodiments, the metrics update module 216 provides the data to the send analytics event module 218 only for events that are non-revenue generating events, and the buffer and retry module 220 for only revenue generating events. In such embodiments, the revenue generating events will be provided to the analytics database 110 through a different pipeline than non-revenue generating events. The revenue generating events will be provided to the database 110 through the tracker module 118 and the non-revenue generating events will be provided to the database 110 through the send analytics event module 218.

Figure 3:
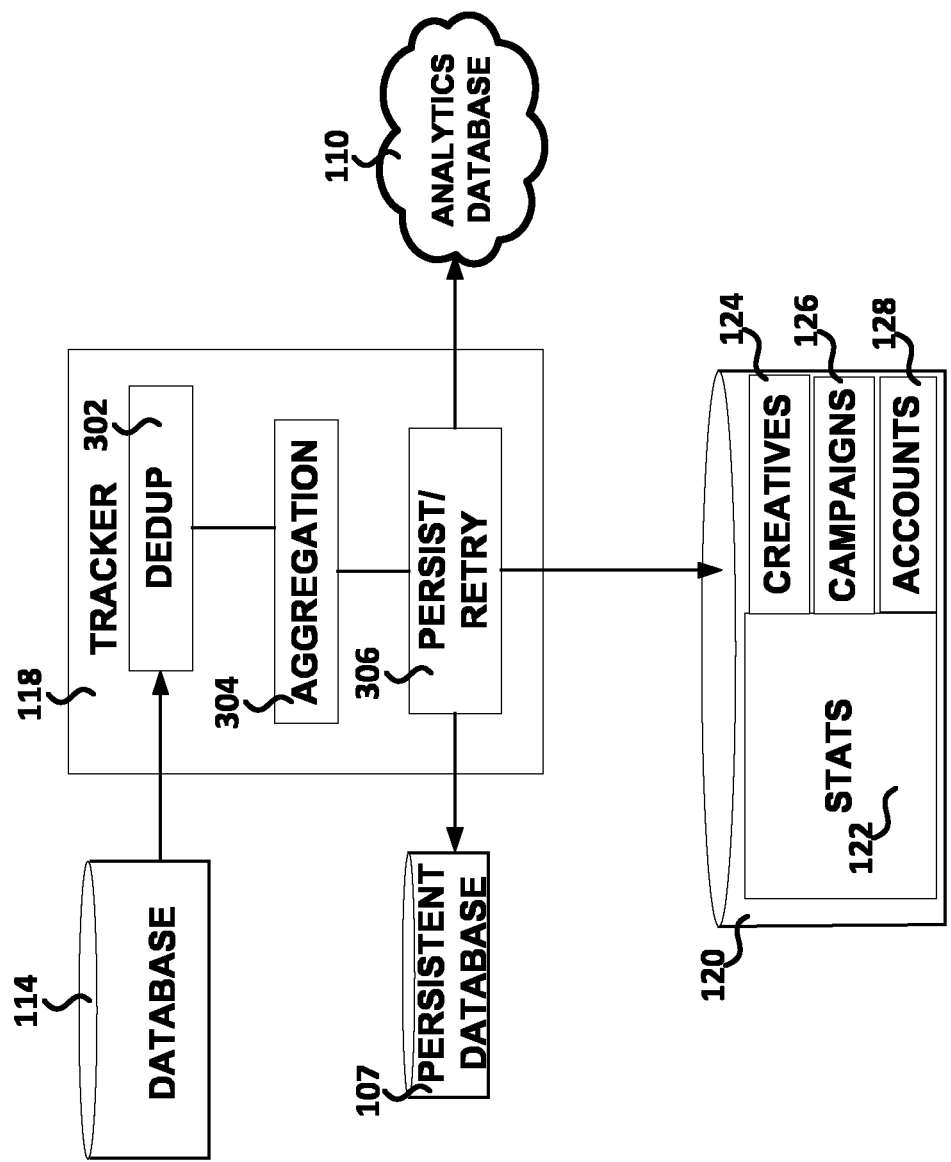
FIG. 3 illustrates, by way of example, a block diagram of an embodiment of a tracker module and peripheral devices with which the tracker module communicates.

FIG. 3 illustrates, by way of example, a block diagram of an embodiment of the tracker module 118 and peripheral items with which the tracker module 118 communicates. The tracker module 118 as illustrated includes a deduplication module 302, an aggregation module 304, and a persist/retry module 306. The deduplication module 302 is communicatively coupled to the database 114. The persist/retry module 306 is communicatively coupled to the database 107. The tracker module 118 provides data to the analytics database 110 and the database 120, such as through the persist/retry module 306.

In one or more embodiments, the tracker module 118 performs a roll-up of tracking events (e.g., impression, click, and/or conversion events) received by performing a write to multiple tables for each revenue generating tracking event that is received and not marked as invalid (by the fraud manager module 212 or the deduplication module 202). In one or more embodiments, each tracking event received is aggregated and a write (e.g., a single write) is made that updates the creatives table 124, the campaigns table 126, and the accounts table 128. By updating each of the tables (e.g., simultaneously) the tracker module 118 makes it easier to access data at all levels, creative-level, campaign-level and account-level. Otherwise, more operations would need to be performed on the creative-level table to determine if a campaign or account is at or nearing completion or other campaign or account level concerns. An example of such a write is provided:

---

POST /TSCP/*/100
Content-Type: multipart/byteranges;
boundary="----=_Part_14790_715755978.1360716179726"
------=_Part_14790_715755978.1360716179726
Content-Type: application/json
Content-Location: /TSCP/CreativeStats/100/2/3/20130219/ELA4
{"impressions": "+5", "clicks": "+1", "cost": "+2.50"}
------=_Part_14790_715755978.1360716179726
Content-Type: application/json
Content-Location: /TSCP/CampaignStats/100/2/day/20130219/ELA4
{"impressions": "+5", "clicks": "+1", "cost": "+2.50"}
------=_Part_14790_715755978.1360716179726
Content-Type: application/json
Content-Location: /TSCP/AccountStats/100/day/20130219/ELA4
{"impressions": "+5", "clicks": "+1", "cost": "+2.50"}

---

The tracker module 118 can update tables at different granularities, such as in the same write operation. For example, if a campaign includes a monthly, daily, and lifetime table, the tracker module 118 can perform a write to all of those tables, such as in a single write.

The deduplication module 302 performs packet level deduplication, as compared to event level deduplication performed by the deduplication module 202. In one or more embodiments, for each arriving packet, an "add" call for the packet ID can be issued to the database 114. If the add call fails, the packet is a duplicate and is discarded. If the add call is successful, the packet is not a duplicate and is forwarded to the aggregation module 304. Each record in the database 114 can include a TTL so that the database 114 will not grow indefinitely. An example of a record data format of a packet received at the tracker module 118 (from the application module 116) and/or stored in the database 114 is provided:

---

{
"type" : "record",
"name" : "TscpTracking",
"namespace" : "com.business.tscp",
"doc" : "TSCP tracking event",
"fields" : [
{ "name" : "cost", "type" : "float"},
{ "name" : "packetId", "type" : "string" },
{ "name" : "requestId", "type" : "string" },
{ "name" : "trackingeventId", "type" : "string" },
{ "name" : "creativeId", "type" : "int" },
{ "name" : "campaignId", "type" : "int" },
{ "name" : "advertiserId", "type" : "int" }, ]
}

---

The tracker module 118 can perform updates to the stats table 122. The stats in the table 122 can include creative stats, campaign stats, and/or account stats. The stats in the stats table can include a variety of time granularities, for example daily, weekly, monthly, yearly, and/or lifetime stats. Examples of data formats for the statistics table can be as follows:

---

{
"schemaType": "DBSchema",
"name": "TSCP",
"version": 1,
"doc": "TSCP Espresso Database schema",
"partitionType": "HASH",
"numBuckets": 256
}
{
"schemaType": "TableSchema",
"name": "CreativeStats",
"version": 1,
"recordType": "/schemata/document/TSCP/Statistics",
"resourceKeyParts":
[{"name": "advertiserId", "type": "LONG"},
{"name": "campaignId", "type": "LONG"},
{"name": "creativeId", "type": "LONG"},
{"name": "day", "type": "LONG"},
{"name": "coloId", "type": "STRING", "maxsize": 10}]
}
{
"schemaType": "TableSchema",
"name": "CampaignStats",
"version": 1,
"recordType": "/schemata/document/TSCP/Statistics",
"resourceKeyParts":
[{"name": "advertiserId", "type": "LONG"},
{"name": "campaignId", "type": "LONG"},
{"name": "granularity", "type": "STRING", "maxsize": 10},
{"name": "dayOrMonth", "type": "LONG"},
{"name": "coloId", "type": "STRING", "maxsize": 10}]
}
{
"schemaType": "TableSchema",
"name": "AccountStats",
"version": 1,
"recordType": "/schemata/document/TSCP/Statistics",
"resourceKeyParts":
[{"name": "accountId", "type": "LONG"},
{"name": "granularity", "type": "STRING", "maxsize": 10}, -continued

```
{"name": "dayOrMonth", "type": "LONG"},
{"name": "coloId", "type": "STRING", "maxsize": 10}]
}
```

Each of the tables can have a same or different document schema. An example of a document schema includes:

```
{
    "schemaType": "DocumentSchema",
    "type": "record",
    "name": "Statistics",
    "version": 1,
    "fields":
    [{"name": "impressions", "type": "long", "default": 0},
    {"name": "clicks", "type": "long", "default": 0},
    {"name": "clicksOther", "type": "long", "default": 0},
    {"name": "conversions", "type": "long", "default": 0},
    {"name": "cost", "type": "double", "default": 0.0},
    {"name": "costInUSD", "type": "double", "default": 0.0},
    {"name": "lastUpdateTime", "type": "long"}]
}
```

The aggregation module 304 receives packets from the deduplication module 302. In embodiments in which the tracker module 118 is partitioned, the aggregation module 304 is also partitioned according to the same partitioning scheme. The aggregation module 304 flushes data therein at specified time intervals, such as can be based on whether the data is associated with a revenue or non-revenue generating event. The aggregation module 304 determines if a packet received is associated with a revenue generating event or a non-revenue generating event (e.g., a revenue generating event includes a non-zero cost field). If the event is a revenue generating event, the aggregation module 304 can transfer the data to a persist/retry module 306 faster than if the event data corresponds to a non-revenue generating event. For example, consider an instance in which the aggregation module 304 has five non-revenue generating events and currently has twenty-five seconds to wait before transferring the five events to the persist/retry module 306 when the aggregation module 304 receives a revenue generating event. The aggregation module 304 can transfer all six of the events to the persist/retry module 306 in five seconds (or whatever time is specified to transfer the revenue-generating event to the persist/retry module 306). Consider the same instance, except the five non-revenue generating events would be transferred to the persist/retry module 306 in three seconds, rather than twenty-five, when the revenue generating event arrives. All of the events aggregated in the aggregation module 304 are transferred to the persist/retry module 306 in three seconds if the time in which to transfer the revenue generating event is greater than (or equal to) three seconds.

The persist/retry module 306 determines if the data from the aggregation module 304 is successfully transferred to the database 110 and/or 120. If the data is not transferred successfully, then the persist/retry module 306 stores the data on the persistent database 107, and will attempt to transfer the data until it is successful or until a specified period time has elapsed, whichever comes first. This functionality is the same as or similar to the functionality of the buffer 104 and persistent database 107 as discussed with regard to FIG. 1.

Figure 4:
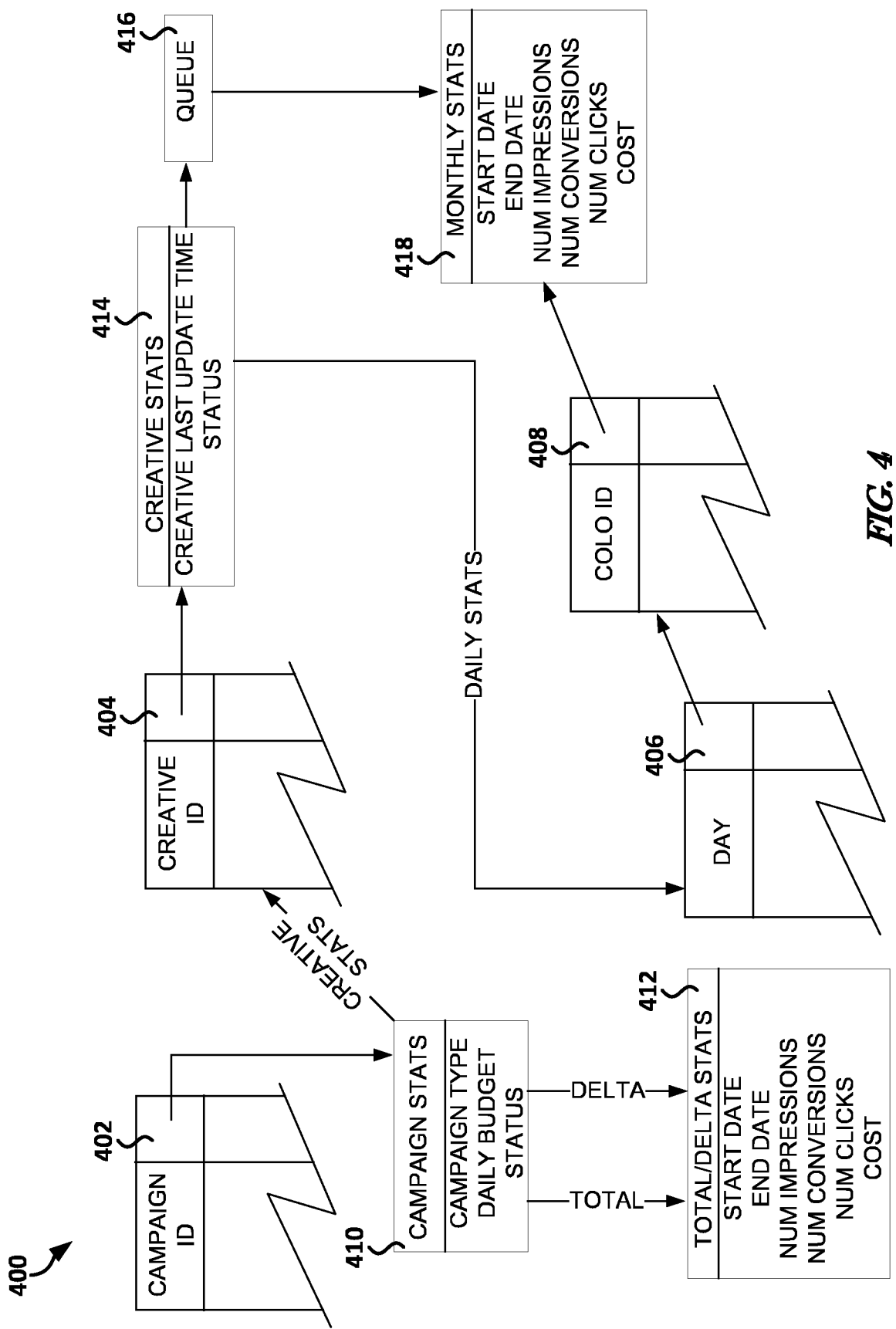
FIG. 4 illustrates, by way of example, a flow diagram of an embodiment of hashmap data stored in stats cache tables.

FIG. 4 illustrates, by way of example, an embodiment of contents 400 of an in-memory stats cache, such as can be stored in the budget and performance control module 132. The data in the stats cache can be provided to the database 120 to update table(s) 122, 124, 136, 128, 124A, 126A, 128A, and/or 144. The data in the cache tables can be used for budget and performance control, such as can include terminating, suspending, activating, or re-activating a creative, campaign, and/or account.

The contents 400 as illustrated include a hashmap of the campaign-level stats 402, a hashmap of the creative-level stats 404, a hashmap of the day level stats 406, and a hashmap of the colo level stats 408. The stats 410 in the map 402 can include a campaign type, a daily/lifetime budget of the campaign, and/or a status for each campaign. The stats 410 can include total and/or delta stats 412 that can include a start date (e.g., date and time) of the delta, an end date of the delta, a number of impressions in the total and/or delta, a number of conversions in the total and/or delta, a number of clicks in the total and/or delta, and/or a cost associated with the total(s) and/or the delta. The creative map 404 can include data 414 such as can include a creative last update time and a current active/inactive status of the creative. Daily creative stats hashmap 406 can include one or more of the stats as the total and/or delta stats 412, with the hashmap 406 including numbers for a specified day. The colo data hashmap 406 can include one or more of the stats as the total and/or delta stats 412, with the hashmap 408 including stats for a specified colo for the day. Daily stats from the hashmap 404 can be placed in a queue 416 for a specified period of time and then transferred to a hashmap 418 of the cache that details a week, month, or other specified time interval of stats for the creative(s) and/or colo(s). The month data hashmap 418 can include one or more of the stats as the total and/or delta stats 412, with the hashmap 418 including stats for a specified creative and/or colo over a specified period of time greater than a day.

FIG. 5 illustrates, by way of example, a block diagram of an embodiment of a system 500 for replicating data across multiple data centers. The system 500 as illustrated includes two data centers 501A and 501B, sometimes referred to as colos. Each data center 501A-B includes an instance (e.g., a partitioned or un-partitioned instance) of the tracking module 108A-B, respectively, an instance (e.g., a partitioned or un-partitioned instance) of the database 120A-B, respectively, an instance (e.g., a partitioned or un-partitioned instance) of the intelligence module 130A-B, respectively, and an instance (e.g., a partitioned or un-partitioned instance) of the database 140A-B, respectively. The suffixes on the reference numbers indicate that the corresponding item is an instance of an item that does not include the suffix. For example, the tracking module 108A is a specific instance of the tracking module 108 and performs the same operations as described with regard to the tracking module 108.

At a high level, delta data (changes to data from a previous data state) from the stats tables 122C that includes a colo ID that corresponds to the data center 401A is replicated to the stats table 122D and delta data from the stats tables 122D that includes a colo ID that corresponds to the data center 501B is replicated to the stats table 122C through a bi-directional replication path 502. Since both data centers 501A-B may be serving the same campaign, care can be taken to not just write over an entry in a stats table 122C-D. In one or more embodiments, the write to a stats table 122C-D is an incremental write (add or subtract the delta as defined by the delta data to an entry). In one or more embodiments, the tables in each data center include a coloID column that identifies the data center 501A-B associated with the data and tracking events from the module 108A-B received at the database 120A-B are only processed in the data center 501A-B if the tracking event includes a coloID that corresponds to the data center 501A-B. If the coloID does not match the data center 501A-B, then the data is queued and provided to the other data center(s) during a replication process. In such embodiments, only data associated with the coloID corresponding to data to be updated by the data center 501A-B is replicated to the other data centers 501A-B. For example, if data includes a coloID corresponding to the data center 501A then only data associated with the same coloID is transferred to the data center 501B. The tracking events associated with data to be processed by the other data center is queued for processing in the corresponding data center.

The databases 120A-B and 140A-B, tracking modules 108A-B, and intelligence modules 130A-B interact as previously described, with deltas corresponding to each write to each database 120A-B and 140A-B being recorded and aggregated by the replicator modules 502 and 504. The deltas can be at the creative level, campaign level, account level, one or more different time granularities (day, week, month, year, lifetime, etc.), or other delta levels or granularities depending on the structure of the stats data tables 122C and 122D.

The replication of the database 140A to the database 140B is illustrated as being a unidirectional replication using the replication module 504. In embodiments in which the database 140A includes a database from Oracle Corporation of Redwood City, Calif., United States, the replication module 504 can include a GoldenGate package from Oracle Corporation. In embodiments in which the replication module 504 is uni-directional, the database 140B is a slave to the master database 140A. In such embodiments, the module 142, and the stats and budget control operations performed by the intelligence module 130 (e.g., the budget and performance control module 132 of the intelligence module) can only run in the master data center 501A and not in the slave data center 501B.

FIG. 6 illustrates, by way of example, a block flow diagram of an embodiment of a multicolo replication system 600. The system 600 as illustrated includes the datacenters 501A-B communicatively coupled to each other. The datacenter 501A in the embodiment shown is the master and the datacenter 501B is the slave. The datacenter 501A as illustrated includes the tracker client 103 communicatively coupled to a router consumer 602 (e.g., a databus consumer) of the database 120. The consumer 602 routes the data from the tracker module 108 to a storage node 604A, 604B, and/or 604B of the database 120. The storage nodes 604A-C each represent a storage partition of the database 120, such as can be partitioned by advertiser ID. In one or more embodiments, the storage nodes 604A-C are MySQL™ databases. The storage nodes 604A-C forward the data received from the router consumer 602 to a relay consumer 606. The relay consumer 606 can determine the deltas and/or totals for a corresponding creative, day, month, lifetime, colo, and so forth. The relay consumer 606 includes a cache on which at least some of the data determined by the relay consumer 606 can be stored (temporarily, such as for a specified time interval). The relay consumer 606 can roll up the stats to the campaign and/or advertiser level, such as by writing the proper increment to the proper campaign and/or advertiser stats table entries in the storage node 604A-C and the cache of the relay consumer 606.

The relay consumer 606 determines whether the cached stats changes make up a specified percentage difference in one or more of the total stats, for example a 5% or greater change. If the stats changes are greater than (or equal to) the specified difference, the data can be forwarded to the performance consumer 608, such as to update the performance serving and performance control table 144. The performance consumer 608 can compute a CTR, urgency, and/or impressions or clicks per day for campaign and/or creative levels. In one or more embodiments, the data determined by the performance consumer 608 can be buffered and transferred to the database 140 in a batch update to the serving and performance control table 144. In embodiments that support subscription campaigns, seed data can be used to artificially adjust the CTR. In such embodiments a hashmap of campaignId to the pair of <impressions, clicks> can be used. This seed data can be included in the CTR, urgency, and/or impressions or clicks per day for subscription campaigns. For the database 120, a specified creativeID can be used to indicate seed data (e.g., creativeID=0).

The data from the relay consumer can be transferred to the replicator module 502. The replicator module 502 copies the data to a corresponding database (120B) of the datacenter 501B. In one or more embodiments, the replicator module 502 only copies data that includes a coloID associated with the datacenter 501A to the database of the datacenter 501B.

Delta data from the database 140 is provided to the replicator module 504. The delta data is written to a corresponding database (140B) of the datacenter 501B. At least a portion of the delta data from the database 140 can be provided to a relay/replicator consumer 610. The relay/replicator consumer 610 routes the data to the proper router consumer 602. The data from the database 140 to the relay/replicator consumer 610 can include deltas to be applied to the tables 122, 124, 126, and/or 128 based on data received from the relay consumer 606 and/or performance consumer 608. In one or more embodiments, the consumers 602, 606, 608, and 610 can each be implemented using a Databus consumer from LinkedIn. Consumers, in one or more embodiments, are implemented as modules.

Figure 7:
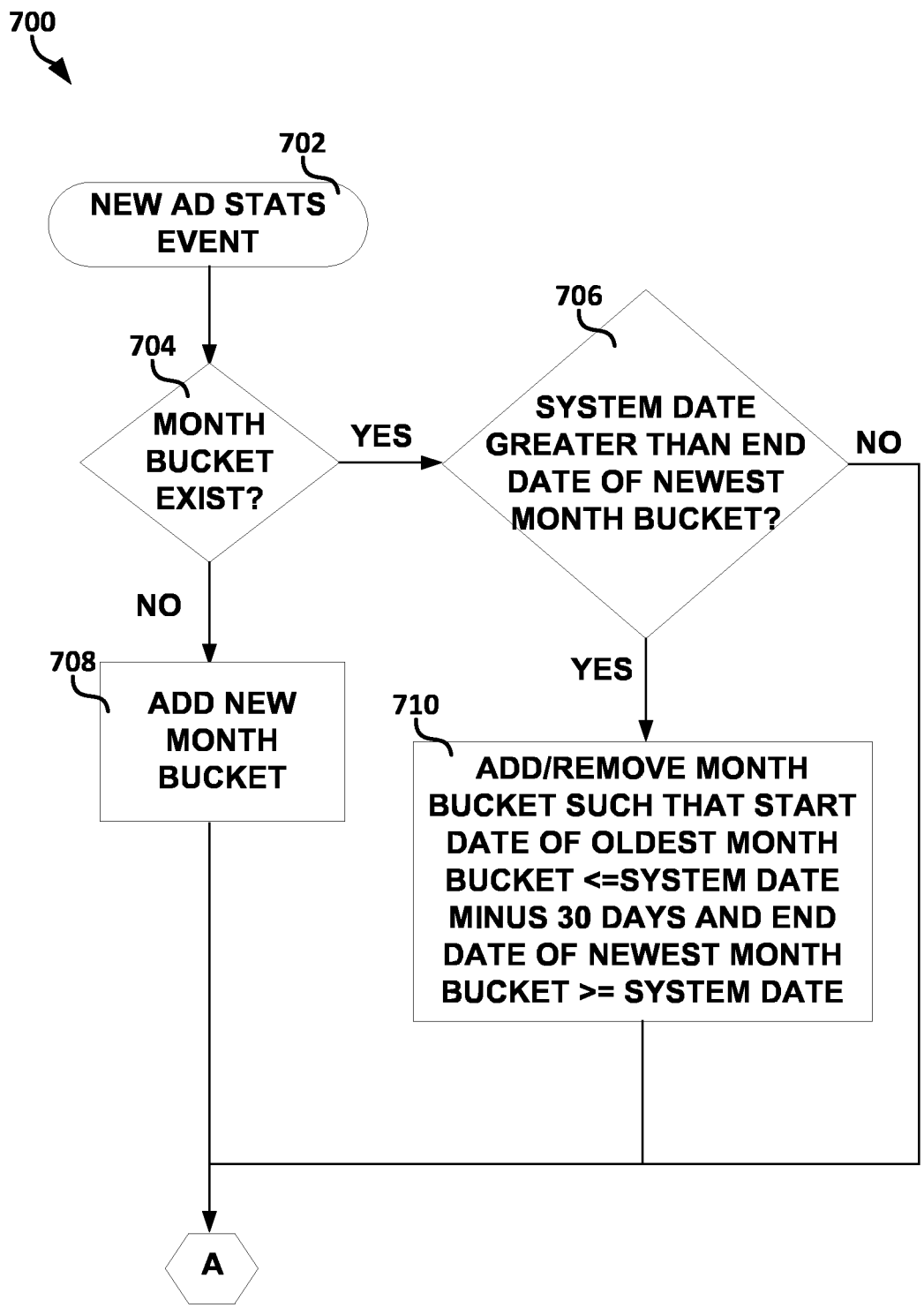
FIGS. 7, 8, and 9 illustrate, by way of example, flow diagrams of an embodiment of a method for handling a new content stats event.
Figure 8:
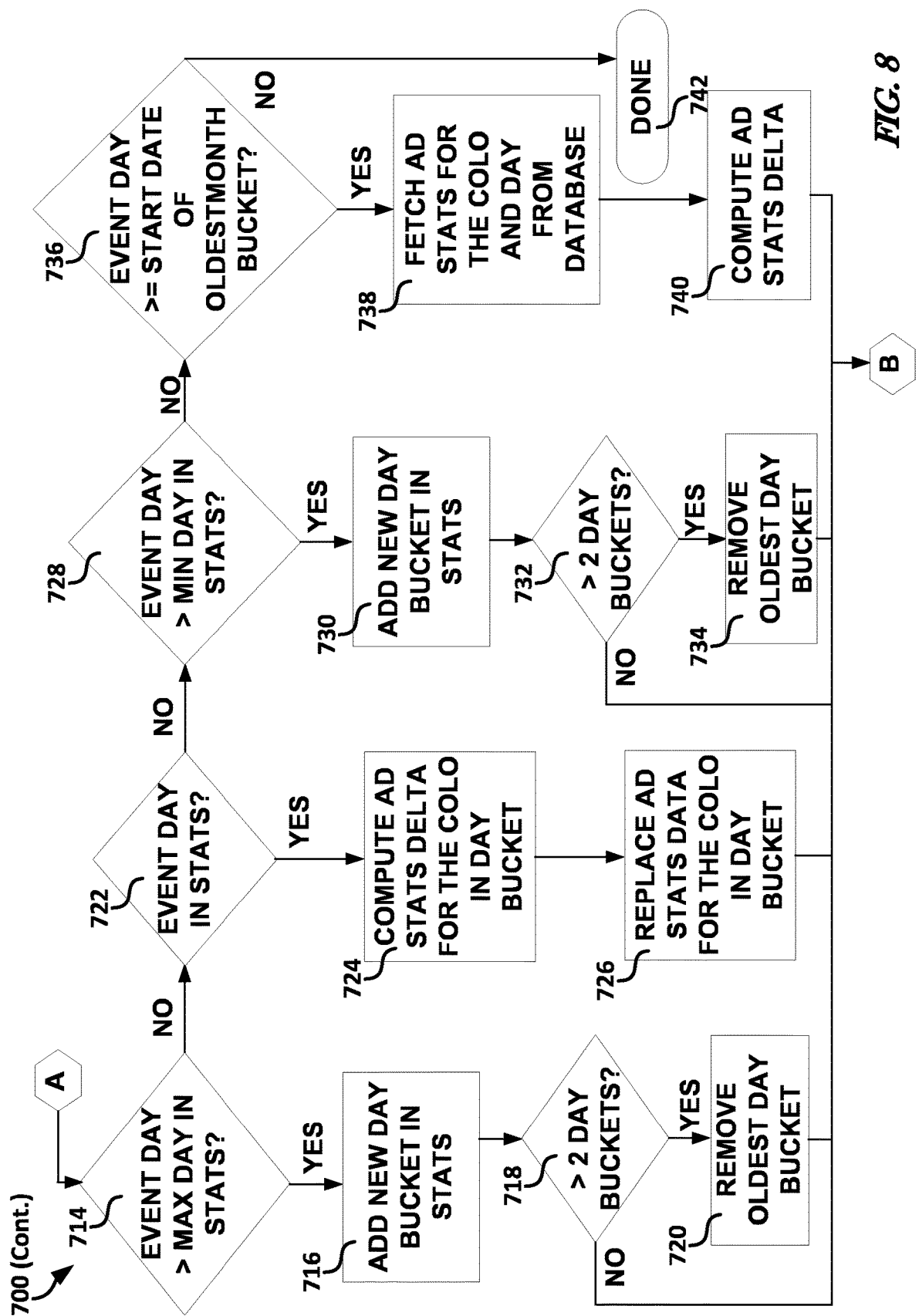
Figure 9:
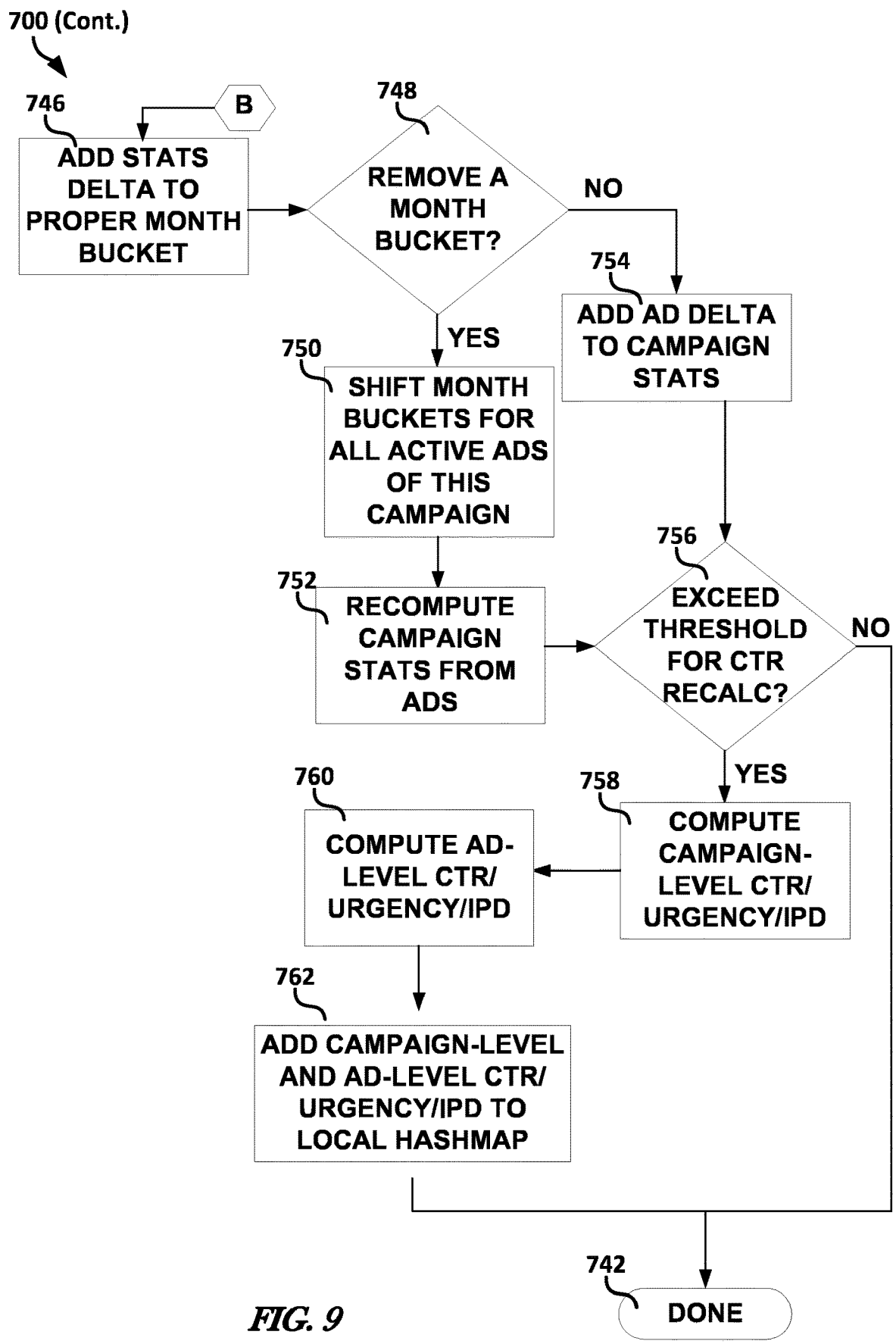

FIGS. 7, 8, and 9 illustrate, by way of example, a flow diagram of an embodiment of a method 700 for processing an event from the consumer 602 to update the cache tables of the intelligence module 130. The operations performed in response to the event can include operations to alter the layout of the data in one or more storage nodes 604A-C or writing over data already present in the storage nodes 604A-C. The operations can be performed by one or more items of the database 120, such as the relay consumers 606 or performance consumers 608.

The method 700 as illustrated includes beginning by receiving a new ad stats event (at or from the consumer 602) at operation 702. At operation 704 it can be determined whether a month bucket corresponding to a month in a timestamp of the received data exists. If the month bucket does not exist a new month bucket in a cache table can be added that corresponds to the month in the timestamp at operation 708. If the month bucket exists, the operation at 706 can be performed in which it is determined if a system date (of an item of the system 100) is greater than an end date of the newest month bucket. The operation 710 can be performed if it is determined that the system date is greater than the end data of the newest month bucket at operation 706. At operation 710 a month bucket can be added and/or removed such that a start date of an oldest month bucket is less than (or equal to) the system date minus a specified number of days (e.g., 30 or other number of days) and an end date of the newest month bucket is greater than or equal to the system date. The method 700 as illustrated continues at operation 714 in response to performing the operation 708, operation 710, or determining that the system date is not greater than the end date of the newest month bucket at operation 706.

The operation 714 includes determining if a day of the month in the timestamp is greater than a most recent day documented in the nodes 604A-C. If the event day is greater than the most recent day documented, a new day bucket is added to one or more of the tables in the storage nodes 604A-C at operation 716. In response to adding the new day bucket at operation 716, it is determined if there are currently more than a specified threshold number of day buckets in the nodes (e.g., greater than two or other number) an oldest day bucket can be removed at operation 720.

If it is determined, at operation 714, that the event day is not greater than the most recent day documented it can be determined if a day bucket corresponding the day of the timestamp is present in one or more of the tables of the storage nodes 604A-C at operation 722. If the day bucket does exist, than an ad stats delta for the day bucket (of the colo) can be computed at operation 724. In response to performing the operation at 724, the ad data in the day bucket can be replaced with the determined delta stats.

If it is determined, at operation 722, a day bucket corresponding the day of the timestamp is not present in one or more of the tables of the nodes 604A-C, it can be determined if the day in the timestamp is greater than an oldest day in the data of the storage nodes 604A-C. If the day is greater than the oldest day, then a new day bucket can be added to one or more of the tables in the storage nodes 604A-C. Operations 732 and 734 are the same as the operations 718 and 720, with the operations being performed in response to performing the operation 730.

If it is determined, at operation 728, that the day in the timestamp is not greater than an oldest day in the data of the storage nodes 604A-C, it can be determined if the day in the timestamp is greater than (or equal to) a start date of an oldest month bucket at operation 736. In response to determining that the day in the timestamp is greater than (or equal to) a start date of an oldest month bucket, ad stats for the colo and day can be fetched from the database 120 (e.g., the storage nodes 604A-C) at operation 738. In response to performing the operation at 738 an ad stats delta can be computed at operation 740. In response to determining that the day in the timestamp is not greater than (or equal to) a start date of the oldest month bucket at operation 736, the method 700 can terminate at operation 742.

Operation 746 can be performed in response to performing the operation 720, 726, 734, or 740. The operation 746 includes adding a determined stats delta to a proper month bucket (a month bucket corresponding to a month indicated on the timestamp). At operation 748 it can be determined if one or more month buckets are going to be removed from the storage nodes 604A-C. If the month bucket(s) are going to be removed, the month bucket(s) can be shifted such that the second to oldest month bucket becomes the oldest, the newest month bucket becomes the second newest month bucket, and so forth, at operation 750. At operation 752, campaign stats for the newest month bucket can be computed from the new ad stats (e.g., at operation 724 or 740). If the month bucket(s) are not going to be removed the ad delta can be added to the corresponding campaign stats at operation 754. Operation 756 can be performed in response to performing the operation 752 or 754. The operation 756 includes determining if the changing of the campaign stats at operation 752 or 754 causes a CTR of the campaign or ad to exceed a specified threshold change percentage. If it does not exceed the change threshold, then the method 700 terminates at operation 742. If it does exceed the change threshold, campaign level CTR, urgency, and/or IPD (e.g., impressions per day or clicks per day) can be computed at operation 758 based on the newly added stats. In response to performing operation 758, ad-level CTR, urgency, and/or IPD can be computed at operation 760. At operation 762, the CTR, urgency, and/or IPD calculated at operation 758 and/or 760 can be added to a local hashmap of the performance stats (e.g., the stats table 122), such as can be used for later update of the database 140.

Figure 10:
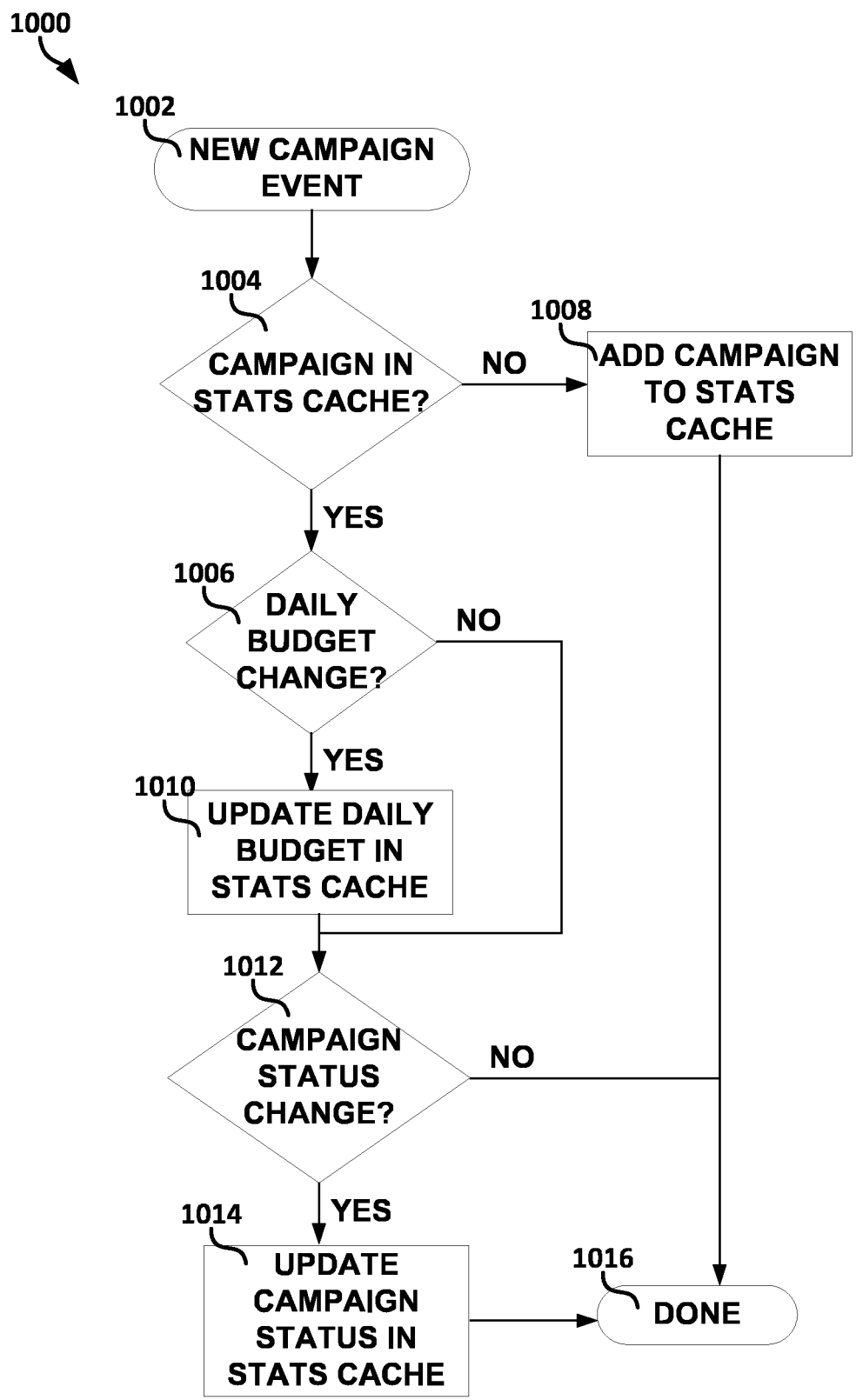
FIG. 10 illustrates, by way of example, a flow diagram of an embodiment of a method for handling a new campaign event.

FIG. 10 illustrates, by way of example, a flow diagram of a method 1000 for processing a campaign event from the router consumer 602. A campaign event is an event that effects a campaign (includes a campaign ID identified in the data). At operation 1002 the method 1000 begins by receiving a new campaign event (e.g., at the router consumer 602 or the storage nodes 604A-C). At operation 1004 it can be determined if a campaign including a same campaign ID as that identified in the new campaign event is in the stats cache. If such a campaign ID is in the stats cache, it can be determined if the campaign event has an associated cost (cost field is non-zero) such that the daily budget of the campaign is changed. If such a campaign ID is not in the stats cache the campaign can be added to the stats cache and the corresponding entry can be updated to reflect the data of the campaign event.

If the daily budget is changed by the campaign event, then the daily budget can be updated at operation 1010. In response to performing operation 1010 or in response to determining that the daily budget is not changed by the campaign event (e.g., cost field=0) operation 1012 can be performed. At operation 1012, it can be determined if received campaign event requires a change in the campaign status (e.g., the daily budget of the campaign is <=0). If the event triggers a change in the campaign status, then the campaign status can be updated in the stats cache at operation 1014. The method 1000 can terminate at operation 1016 in response to performing operation 1008 or 1014 or in response to determining the campaign event does not trigger a campaign status change.

Figure 11:
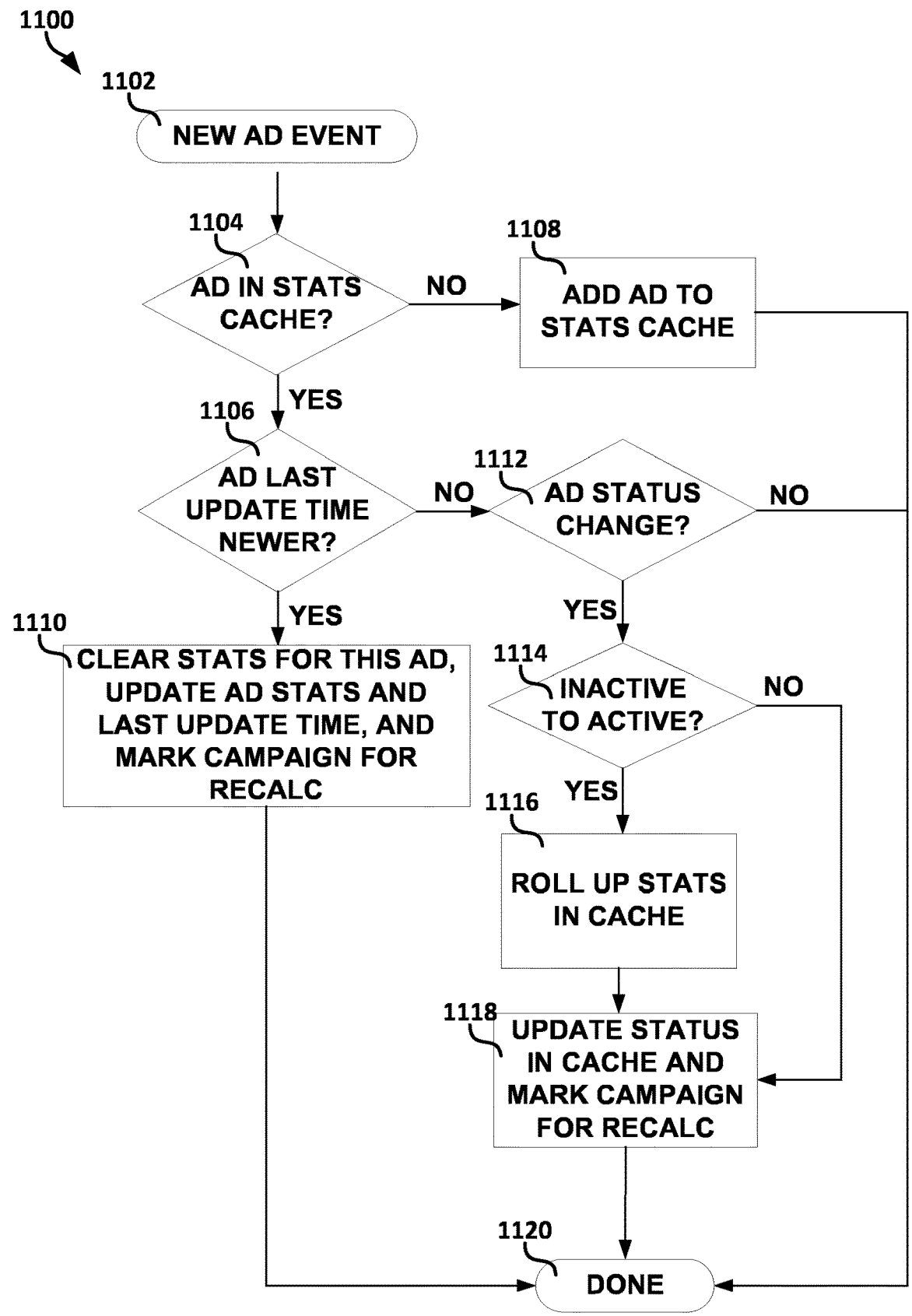
FIG. 11 illustrates, by way of example, a flow diagram of an embodiment of a method for handling a new content event.

FIG. 11 illustrates, by way of example, a flow diagram of a method 1100 for processing an ad event from the tracker client 103 or the router consumer 602. An ad event is a tracking event that effects serving of an ad (includes a creative ID identified in the data). At operation 1102 the method 1100 begins by receiving a new ad event (e.g., at the router consumer 602 or the storage nodes 604A-C). At operation 1104 it can be determined if an ad including a same creative ID as that identified in the new ad event is in the stats cache. If such a creative ID is in the stats cache, it can be determined if a last update time of the ad is different from that last update time of the ad as stored in the cache at operation 1106. If such a creative ID is not in the stats cache an entry including the creative ID can be added to the stats cache.

If it is determined at operation 1106 that the ad last update time is newer than the date indicated in the stats cache, than the stats for the ad in the stats cache can be cleared, updated to reflect the ad last update time and the other data associated with the ad event, and/or a campaign associated with the ad can be marked such that stats for the campaign can be recalculated at operation 1110. If it is determined at operation 1106 that the ad last update time is not newer than the date indicated in the stats cache, it can be determined at operation 1112 whether the new ad event has caused the ads status to change (e.g., a campaign with which the ad is associated no longer has a daily or lifetime budget greater than zero or the event corresponds to a previously inactive ad being served again). If the ad event has caused the ads status to change then it can be determined if the ads status is changing from inactive to active at operation 1114. If the ads status is becoming active from inactive than the stats for the ad can be rolled into the campaign and/or advertiser stats tables in the cache at operation 1116. At operation a status of the ad in the cache can be updated and/or a campaign associated with the ad can be marked for recalculating stats. The operation 1118 can be performed in response to performing the operation 1114 or 1116. The method 1100 can terminate at operation 1120, such as in response to performing the operation 1108, 1110, 1112, or 1118.

Figure 12:
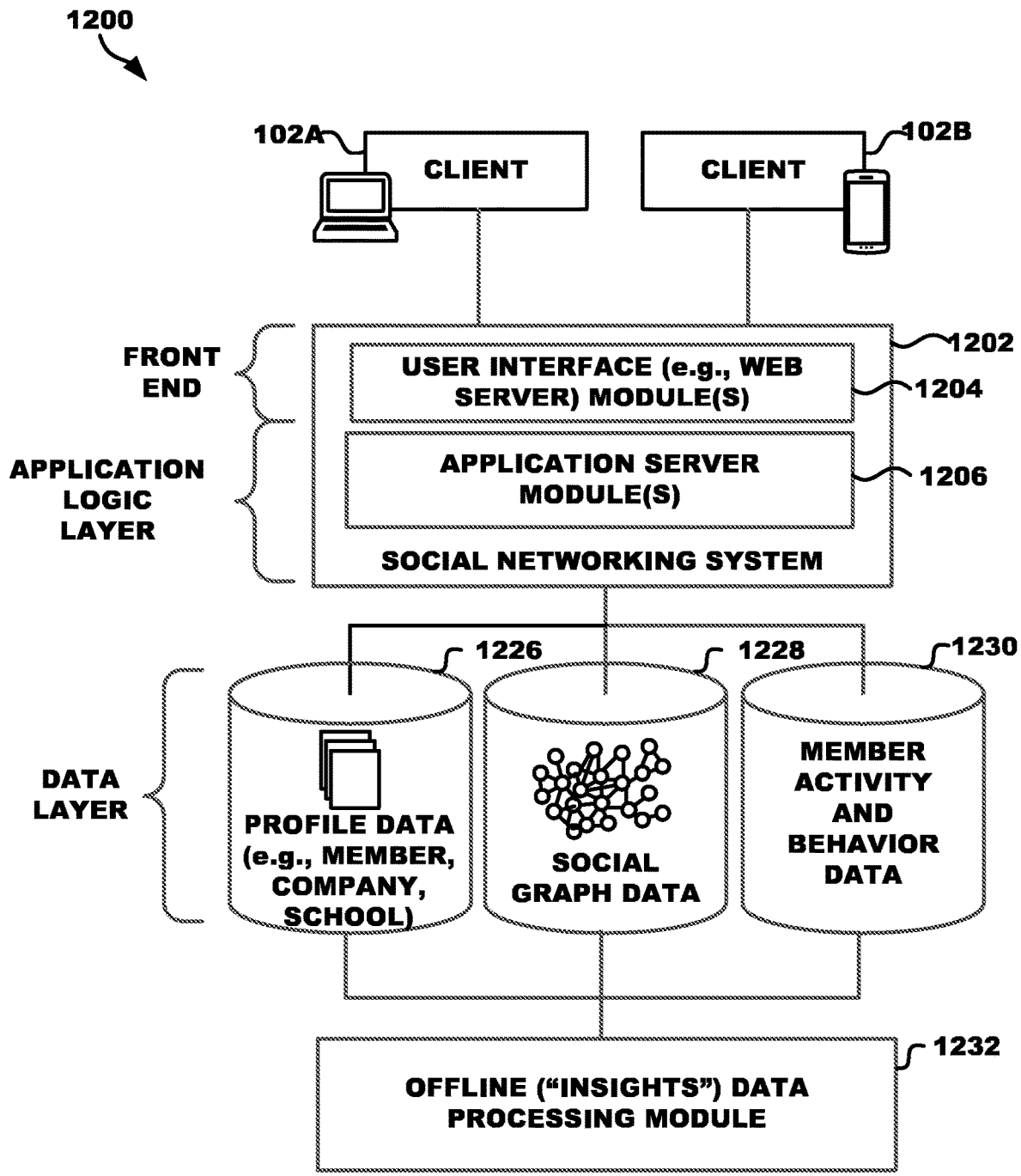
FIG. 12 illustrates, by way of example, a block diagram of an embodiment of a computer network environment in which the systems and methods discussed herein can be deployed and/or performed.

FIG. 12 illustrates, by way of example, a block diagram of an embodiment of a computer network environment 1200 in which the systems and methods discussed herein can be deployed and/or performed. The system 100 can be deployed or the process 700, 1000, and/or 1100 can be implemented using the environment 1200. In one or more embodiments, the user clients 102A and 102B are specific instances of the user client 102. In one or more embodiments, the tracker client 103 can be implemented as a UI module 1204. In one or more embodiments, the tracking module 108 (e.g., the module 116 and/or 118), the intelligence module 130 (e.g., the module 132 and/or 134), the coordinator module 136, the ad and tracking details module 138, and/or the replicator module 142 can be implemented as application server modules 806, such as by incorporating the corresponding module(s) in the application server module(s) 1206. In one or more embodiments, the analytics database 110 is a part of the data layer coupled to offline data processing module 1232. In one or more embodiments, the database 107, 112, 114, 120, and/or 140 are part of the data layer.

The computer network environment 1200 can include a social networking system 1202 that includes one or more application server modules 1206 that provide any number of applications and services that leverage the social graph data database 1228 maintained by the social networking system 1202. For example, the social networking system 1202 may provide a photo sharing application, a job posting and browsing service, a question-and-answer service, and so forth, which may include presentation of advertisements or other content, such as an article, a post by another user (e.g., on behalf of themselves or a business), a comment to a post, an indication of a significant milestone being achieved by another user (e.g., a work or wedding anniversary, a birthday, or other milestone), or other content using the service.

The social network environment 1200 can provide a social networking service. A social networking service is an online service, platform and/or site that allows users of the service to build or reflect social networks or social relations among members. Typically, users construct profiles, which may include characteristics (e.g., personal information), such as the member's name, contact information, employment information, photographs, personal messages, status information, links to web-related content, blogs, and so on. In order to build or reflect these social networks or social relations among members, the social networking environment 1200 allows members to identify, and establish links or connections with other members. For instance, in the context of a business networking service (a type of social networking service), a person may establish a link or connection with his or her business contacts, including work colleagues, clients, customers, personal contacts, and so on. With a social networking service, a person may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of business networking purposes and a social networking service may likewise be used for business networking purposes as well as or in place of social networking purposes.

As shown in FIG. 12, the front end includes the UI module 1202 and the user client(s) 102A and 102B. The user clients 102A and 102B render web pages presented using the UI module 1202.

The application logic layer can include various application server modules 1206, which, in conjunction with the UI module 1202, generate various UIs (e.g., web pages) with data retrieved from one or more sources of various data sources in the data layer. In some embodiments, individual application server modules 806 can be used to implement the functionality associated with various applications, services and/or features of the social networking environment 800. For instance, a social networking service may provide a broad variety of applications and services, to include the ability to search for and browse profile pages, job listings, or news articles. Additionally, applications and services may allow users to share content with one another, for example, via email, messages, and/or content postings (sometimes referred to as status updates, such as on a profile page) via a data feed (e.g., specifically tailored) to a user. The application server modules 1206 can provide the functionality that crowdsources information from users of the social networking service 1202.

As shown in FIG. 12, the data layer includes several databases, such as the database 1226 for storing profile data, including both user profile data as well as profile data for various entities (e.g., companies, schools, non-profit organizations, government organizations, and other organizations) represented in the social graph maintained by the social networking service, such as in the social graph data database 1228. Consistent with some embodiments, when a person initially registers to become a user of the social networking service, the person can be prompted to provide some personal information, such as his or her name, age (e.g., birthdate), gender, interests, contact information, home town, address, the names of the user's spouse and/or family users, educational background (e.g., schools, majors, matriculation and/or graduation dates, etc.), employment history, skills, professional organizations, and so on. This information, generally referred to as user profile information or user characteristic(s), is stored, for example, in the database 1226.

Similarly, when a representative of an organization initially registers the organization with the social networking service (e.g., represented by the social networking system 1202), the representative may be prompted to provide certain information about the organization. This information—generally referred to as entity profile information—may be stored, for example, in the database 1226 or another database (not shown). With some embodiments, the profile data may be processed (e.g., in the background or offline, by the offline data processing module 1232) to generate various derived profile data. For example, if a user has provided information about various job titles the user has held with the same or different companies, or for how long, this information can be used to infer or derive a user profile attribute indicating the user's overall seniority level, or seniority level within a particular entity. With some embodiments, importing or otherwise accessing data from one or more externally hosted data sources may enhance profile data for both users and organizations. For instance, with companies in particular, financial data may be imported from one or more external data sources, and made part of an entity's profile. Another example can include importing information regarding an entity that has an auto-created profile page.

The module 1232 can be used to perform analytics on the data stored in the persistent storage (e.g., 826, 828, and/or 830). Analytics includes mining data to determine, for example, common characteristics between users that have selected an ad or other content (such as by clicking on the content). The analytics can be used to help increase a user's online presence, the number of user's a post reaches, and/or determine a better marketing strategy for a business. Analytics can help a user determine social values of users that interact with their content, what cultures are more likely to be impacted by the content, and how social media efforts affect search engine optimization algorithms, among others. Analytics can also indicate which phrasing or verbiage should be used in a sentence to have more impact in a social media post.

The module 1232 can also be used for billing advertisers for advertising campaigns. The module 1232 accesses the data in the persistent storage (e.g., the database 120, 140, or other database) to determine if the campaign is satisfied, how many impressions or clicks were received for the campaign, a CTR, urgency, or IPD for the campaign or other functionality described with regard to the consumers and/or stats tables or caches. The module 1232 then determines how much to charge the advertiser for each impression and/or click event and produces a bill that can be displayed to the advertiser, such as by using the client 102A-B or other device that includes a display. The data used by the module 1232 can include data from fields in the data (e.g., URLs) from the tracking client 103, the tracking module 108 or intelligence module 130. Additionally or alternatively, the bill can be forwarded to the advertiser as a hard copy.

Once registered, a user may invite other users, or be invited by other users, to connect via the environment 1200. A "connection" may require a bi-lateral agreement by the users, such that both users acknowledge the establishment of the connection. Similarly, with some embodiments, a user may elect to "follow" another user. In contrast to establishing a connection, the concept of "following" another user typically can be a unilateral operation, and at least with some embodiments, does not require acknowledgement or approval by the user that is being followed. When one user follows another user, the user who is following may receive content postings, status updates, or other content postings published by the user being followed, or relating to various activities undertaken by the user being followed. Similarly, when a user follows an organization, the user becomes eligible to receive content postings published on behalf of the organization and/or system or service-generated content postings that relate to the organization. For instance, messages or content postings published on behalf of an organization that a user is following will appear in the user's personalized feed. In any case, the various associations and relationships that the users establish with other users, or with other entities and objects, can be stored and maintained within the social graph data database 828.

As users interact with the various applications, services, or content made available via the environment 1200, the users' behavior (e.g., content viewed, links selected, etc.) may be monitored and information concerning the users' behavior may be stored, for example, in the user activity and behavior data database 1230.

The information may be used to infer a user's intent and/or interests, and to classify the user as being in various categories. For example, if the user performs frequent searches of job listings, thereby exhibiting behavior indicating that the user is a likely job seeker, this information can be used to classify the user as a job seeker. This classification can then be used as an attribute or characteristic. The attribute or characteristic can be used by others to target the user for receiving advertisements, messages, content postings, or a recommendation. Accordingly, an entity that has available job openings can publish a content posting that is specifically directed to certain users (e.g., users) of the social networking service who are likely job seekers, and thus, more likely to be receptive to recruiting efforts.

This information may be used to determine if an advertising campaign has completed, how much an advertiser is to be charged for a click/impression event occurrence, and/or which ads or other content will be used to populate a user's display on the client 102A-B. This information may be used to track advertisement impressions and click events for general analytics, such as can be used for improved targeting of ads and tailoring of advertisement presentation and content. The offline data processing module 1232 can perform such analytics operations.

Certain embodiments are described herein as including logic or a number of components, modules, or mechanisms. Modules described herein include the tracking module 108, the tracking application logic module 116, the tracker module 118, the budget and performance control module 132, the partition module 134, the coordinator module 136, the ad and tracking details module 138, the replicator module 142, the schema validation dedup module 202, the decoder module 203, the data parser module 204, the processor module 206, the application plugins module 208, the fraud manager module 212, the metrics update module 216, the frequency cap update module 219, the send analytics event module 218, the buffer and retry module 220, the deduplication module 302, the aggregation module 304, the persist/retry module 306, the replicator module 502, the replicator module 504, and the consumer 602, 606, 608, and 610. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

In one embodiment, the modules are written in a computer-programming and/or scripting language. Examples of such languages include, but are not limited to, C, C++, C#, Java, JavaScript, Perl, Python, or any other computer programming and/or scripting language now known or later developed.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 13:
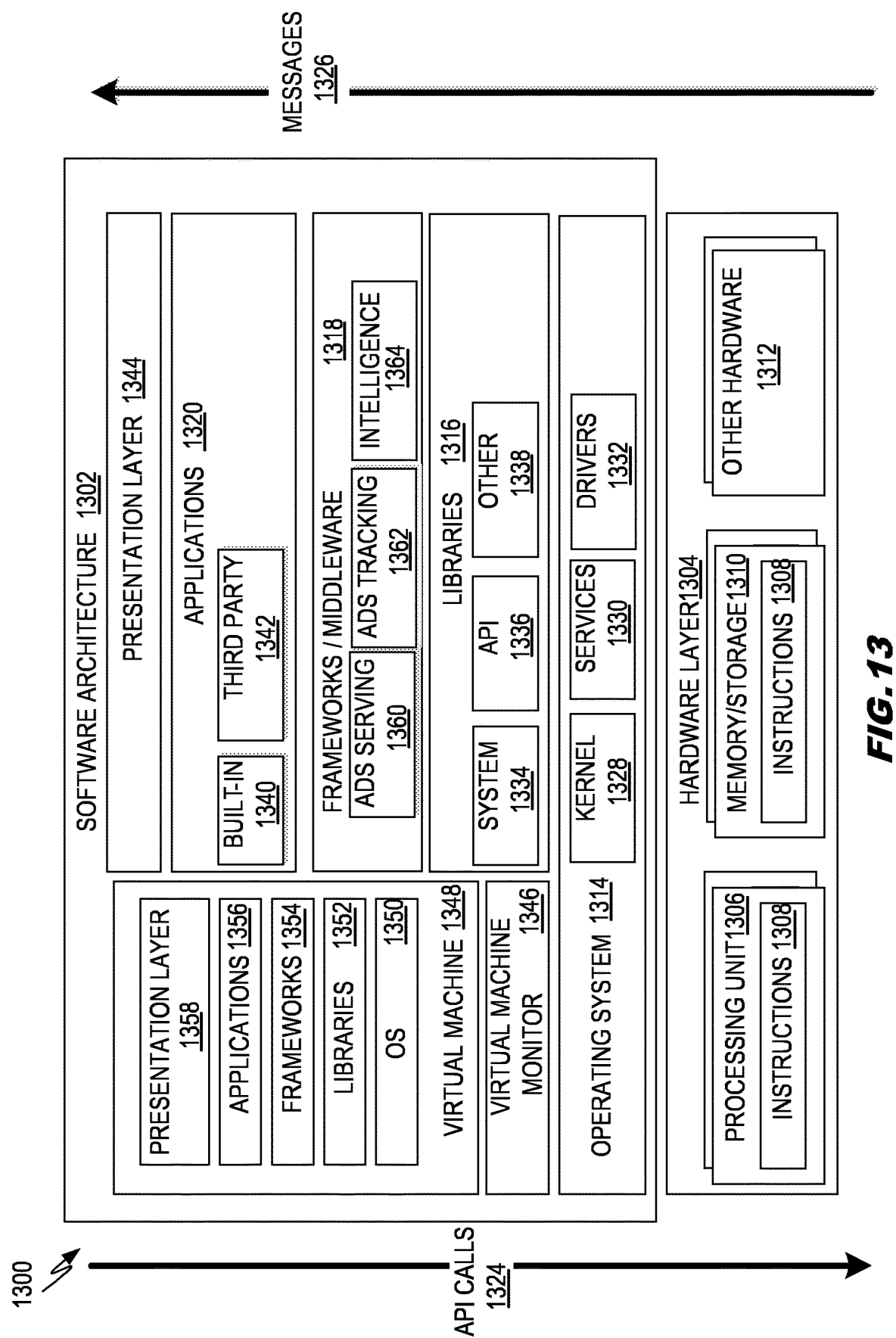
FIG. 13 illustrates, by way of example, a block diagram of an embodiment of a software architecture, which may be used in conjunction with various hardware architectures herein described.

FIG. 13 is a block diagram 1300 illustrating a representative software architecture 1302, which may be used in conjunction with various hardware architectures herein described. FIG. 13 is merely a non-limiting example of a software architecture and it will be appreciated that many other architectures may be implemented to facilitate the functionality described herein. The software architecture 1302 may be executing on hardware such as machine 1400 of FIG. 14 that includes, among other things, processors 1410, memory 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. Executable instructions 1308 represent the executable instructions of the software architecture 1302, including implementation of the methods, modules and so forth of FIGS. 1-12. Hardware layer 1304 also includes memory and/or storage modules 1310, which also have executable instructions 1308. Hardware layer 1304 may also comprise other hardware as indicated by 1312 which represents any other hardware of the hardware layer 1304, such as the other hardware illustrated as part of machine 1400.

In the example architecture of FIG. 13, the software 1302 may be conceptualized as a stack of layers where each layer provides particular functionality. For example, the software 1302 may include layers such as an operating system 1314, libraries 1316, frameworks/middleware 1318, applications 1320 and presentation layer 1322. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature and not all software architectures have all layers. For example, some mobile or special purpose operating systems may not provide a frameworks/middleware layer 1318, while others may provide such a layer. Other software architectures may include additional or different layers. Components of the tracker, such as the application logic module 116 and the tracker module 118 can be a part of the framework/middleware layer 1318.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330 and/or drivers 1332). The libraries 1316 may include system 1334 libraries (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules. The consumers of the system 600 may call one or more of the APIs in performing operations.

The frameworks 1318 (also sometimes referred to as middleware) may provide a higher-level common infrastructure that may be utilized by the applications 1320 and/or other software components/modules. For example, the frameworks 1318 may provide various graphic user interface (GUI) functions, high-level resource management, high-level location services, and so forth. The frameworks 1318 may provide a broad spectrum of other APIs that may be utilized by the applications 1320 and/or other software components/modules, some of which may be specific to a particular operating system or platform. The frameworks 1318 can include an ads serving 1360, an ads tracking 1362, and/or an intelligence 1364 framework. The ads serving 1360, the ads tracking 1362, and the intelligence frameworks are specific software implementations of the client 103, the tracking module 108, and the intelligence module 1130 respectively. The client 103, the ads tracking module 108, and the intelligence module 130 can likewise be implemented as applications 1320, applications 1356, or frameworks 1354.

The applications 1320 includes built-in applications 1340 and/or third party applications 1342. Examples of representative built-in applications 1340 may include, but are not limited to, a contacts application, a browser application, a book reader application, a location application, a media application, a messaging application, and/or a game application. Third party applications 1342 may include any of the built in applications as well as a broad assortment of other applications. In a specific example, the third party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1342 may invoke the API calls 1324 provided by the mobile operating system such as operating system 1314 to facilitate functionality described herein.

The applications 1320 may utilize built in operating system functions (e.g., kernel 1328, services 1330 and/or drivers 1332), libraries (e.g., system 1334, APIs 1336, and other libraries 1338), frameworks/middleware 1318 to create user interfaces to interact with users of the system. Alternatively, or additionally, in some systems interactions with a user may occur through a presentation layer, such as presentation layer 1344. In these systems, the application/module "logic" can be separated from the aspects of the application/module that interact with a user.

Some software architectures utilize virtual machines. In the example of FIG. 13, this is illustrated by virtual machine 1348. A virtual machine creates a software environment where applications/modules can execute as if they were executing on a hardware machine (such as the machine of FIG. 14, for example). A virtual machine is hosted by a host operating system (operating system 1314 in FIG. 14) and typically, although not always, has a virtual machine monitor 1346, which manages the operation of the virtual machine as well as the interface with the host operating system (i.e., operating system 1314). A software architecture executes within the virtual machine such as an operating system 1350, libraries 1352, frameworks/middleware 1354, applications 1356 and/or presentation layer 1358. These layers of software architecture executing within the virtual machine 1348 can be the same as corresponding layers previously described or may be different.

Figure 14:
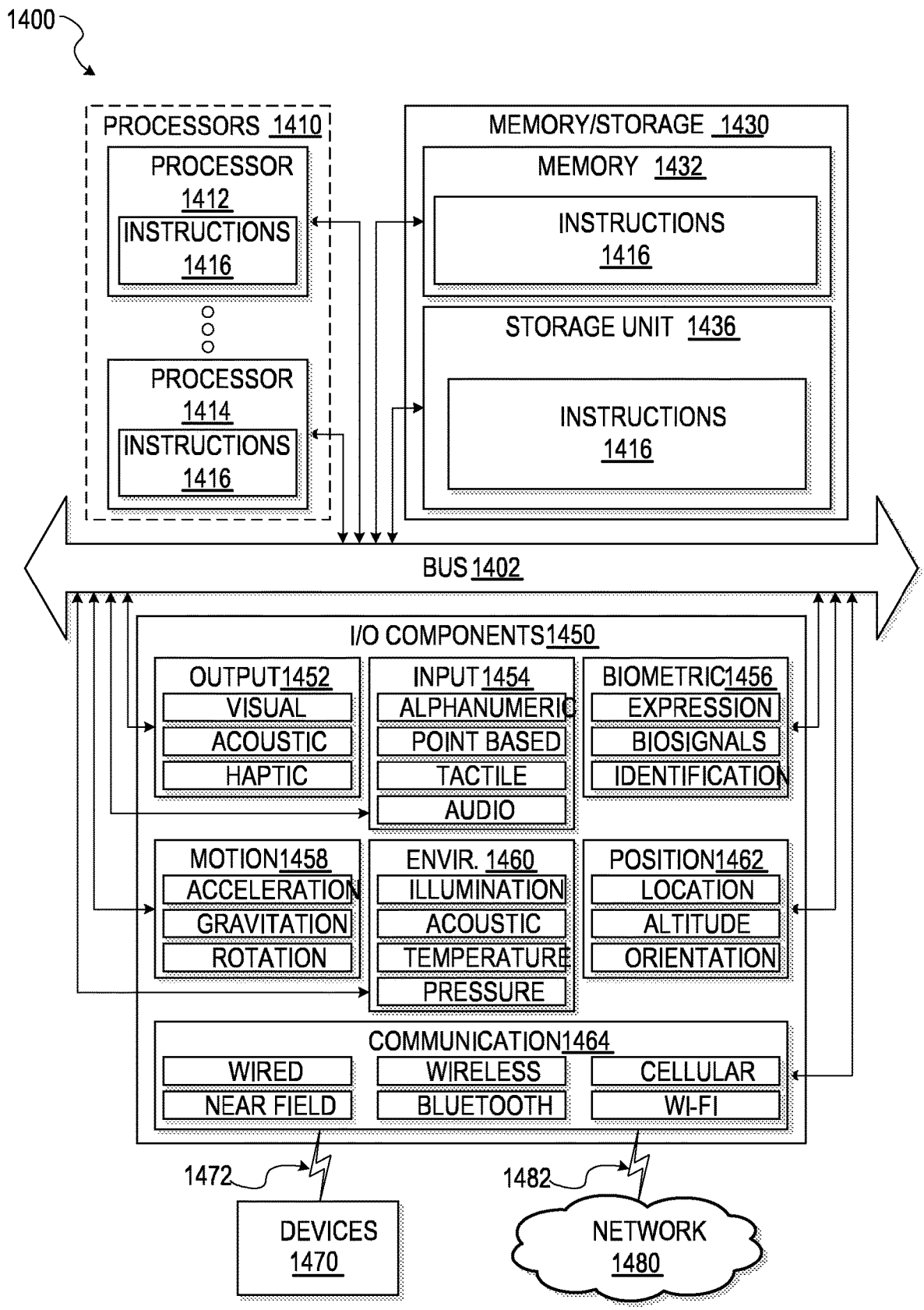
FIG. 14 illustrates, by way of example, a block diagram of an embodiment of a machine able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies or functionality of a module discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example the instructions may cause the machine to execute the flow diagrams of FIGS. 7, 8, 9, 10, and/or 11. Additionally, or alternatively, the instructions may implement the tracking module 108, the tracking application logic module 116, the tracker module 118, the budget and performance control module 132, the partition module 134, the coordinator module 136, the ad and tracking details module 138, the replicator module 142, the schema validation dedup module 202, the decoder module 203, the data parser module 204, the processor module 206, the application plugins module 208, the fraud manager module 212, the metrics update module 216, the frequency cap update module 219, the send analytics event module 218, the buffer and retry module 220, the deduplication module 302, the aggregation module 304, the persist/retry module 306, the replicator module 502, the replicator module 504, and the consumer 602, 606, 608, and 610 of FIGS. 1-3 and 5-6, and so forth. The instructions transform the general, non-programmed machine into a particular machine programmed to carry out the described and illustrated functions in the manner described. In alternative embodiments, the machine 1400 operates as a stand-alone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1412 and processor 1414 that may execute instructions 1416. The term "processor" is intended to include multi-core processor that may comprise two or more independent processors (sometimes referred to as "cores") that may execute instructions contemporaneously. Although FIG. 14 shows multiple processors, the machine 1400 may include a single processor with a single core, a single processor with multiple cores (e.g., a multi-core process), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of processors 1410 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via coupling 1482 and coupling 1472 respectively. For example, the communication components 1464 may include a network interface component or other suitable device to interface with the network 1480. In further examples, communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as, location via Internet Protocol (IP) geo-location, location via Wi-Fi® signal triangulation, location via detecting a NFC beacon signal that may indicate a particular location, and so forth.

EXAMPLES AND NOTES

The present subject matter can be described by way of several examples.

Example 1 can include or use subject matter (such as an apparatus, a method, a means for performing acts, or a machine readable medium including instructions that, when performed by the machine, can cause the device to perform operations), such as can include receiving a tracking event packet including data fields comprising a packet identification that uniquely indicates the tracking event packet, a tracking event identifier uniquely indicating a specific instance of the user interaction with the content, a content identifier uniquely indicating content with which the user interacted, a cost associated with the user interaction, a campaign identifier uniquely indicating a campaign with which the content is associated, and an advertiser identifier uniquely indicating an advertiser that initiated the campaign, determining whether the tracking event packet is a duplicate based on the packet identification and marking the packet as invalid if the tracking event packet is determined to be a duplicate, aggregating non-duplicate tracking event packets by advertiser identification such that packets with advertiser identifications that hash to a same value are aggregated together, transferring aggregated tracking event packets to a first database and a second database, the first database includes data stored for analytics and the second database includes data stored for billing and campaign performance monitoring, and presenting analytics information using data from the transferred aggregated tracking event packets on the first database or providing a bill to the advertiser using data from the transferred aggregated tracking event packets on the second database.

Example 2 can include or use, or can optionally be combined with the subject matter of Examples 1 to include or use, wherein determining whether the tracking event packet is a duplicate includes performing an increment operation on an entry in a third database, the entry associated with the packet identification, comparing a value returned from performing the increment operation to a specified duplicate value, and determining the tracking event packet is a duplicate if the value returned is greater than the specified duplicate value.

Example 3 can include or use, or can optionally be combined with the subject matter of at least one of Examples 1-2 to include or use determining whether the tracking event packet corresponds to a revenue generating tracking event and wherein instructions for transferring aggregated tracking event packets to a first database and a second database include instructions for transferring tracking aggregated event packets to the first and second databases faster if the aggregated event packets include a tracking event packet corresponding to a revenue generating tracking event than if the aggregated event packets do not include a tracking event packet corresponding to a revenue generating tracking event.

Example 4 can include or use, or can optionally be combined with the subject matter of at least one of Examples 1-3 to include or use updating an advertisement stats table, a campaign stats table, and an account stats table by writing, in a single write request to the second database, an increment to an entry in the advertisement stats table based on the content identification, an entry in the creative stats table based on the campaign identification, and an entry in the account stats table based on the advertiser identification.

Example 5 can include or use, or can optionally be combined with the subject matter of at least one of Examples 1-4 to include or use updating a daily campaign stats table, a monthly campaign stats table, and a lifetime campaign stats table by writing, in a single write request to the second database, an increment to an entry in the daily campaign stats table based on the campaign identification, an entry in the monthly campaign stats table based on the campaign identification, and an entry in the lifetime campaign stats table based on the campaign identification.

Example 6 can include or use, or can optionally be combined with the subject matter of at least one of Examples 1-5 to include or use determining a campaign-level click through rate, an urgency for serving ads of the campaign, and an impressions or clicks per day of the campaign based on the received tracking event packet, wherein the urgency is based upon a value of a number of impressions or click events per unit time, on average, that are required to satisfy the campaign.

Example 7 can include or use, or can optionally be combined with the subject matter of Example 6 to include or use comparing the determined campaign-level urgency to a specified urgency threshold and, in response to determining the urgency is greater than the specified urgency threshold, removing content from the campaign that is performing worse than other content of the campaign.

Example 8 can include or use, or can optionally be combined with the subject matter of Example 7 to include or use, wherein removing content form the campaign that is performing worse than other content of the campaign includes determining a content-level click through rate and a content-level impressions or clicks per day for each content of the campaign, comparing the content-level click through rate and the content-level impressions or clicks per day to the campaign-level click through rate and at least one of campaign-level impressions per day and campaign-level clicks per day, respectively, and removing content from the campaign in response to determining, based on the comparison, that the content-level click through rate and the content-level impressions or clicks per day is less than the campaign-level click through rate and the campaign-level impressions or clicks per day, respectively.

Example 9 can include or use, or can optionally be combined with the subject matter of Example 8 to include or use comparing a cost value in the cost field of the tracking event packet to a daily campaign budget, and setting a status field in the tracking event packet to indicate that the campaign is inactive in response to determining that the cost value is greater than or equal to the daily campaign budget.

Example 10 can include or use, or can optionally be combined with the subject matter of at least one of Examples 1-9 to include or use wherein receiving the tracking event packet from the front end tracking client includes receiving only packets that include an advertiser identification value of a number of advertiser identification values that hash to a value associated with a partition of the medium.

The above Description of Embodiments includes references to the accompanying figures, which form a part of the detailed description. The figures show, by way of illustration, specific embodiments in which methods, apparatuses, and systems discussed herein can be practiced. These embodiments are also referred to herein as "examples" or "embodiments". Such embodiments (e.g., examples) can include elements in addition to those shown or described. However, the present inventors also contemplate embodiments in which only those elements shown or described are provided. Moreover, the present inventors also contemplate embodiments using any combination or permutation of those elements shown or described (or one or more aspects thereof), either with respect to a particular embodiment (or one or more aspects thereof), or with respect to other embodiments (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or techniques described herein can be implemented in software or a combination of software and human implemented procedures. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

The above description is intended to be illustrative, and not restrictive. For example, the above-described embodiments (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A non-transitory machine-readable medium comprising instructions stored thereon which, when executed by a machine, cause the machine to perform operations for tracking user interaction with content of a website, the operations comprising:

receiving a tracking event packet including data fields comprising a packet identification that uniquely indicates the tracking event packet, a tracking event identifier uniquely indicating a specific instance of the user interaction with the content, a content identifier uniquely indicating content with which the user interacted, a cost associated with the user interaction, a campaign identifier uniquely indicating a campaign with which the content is associated, and an advertiser identification uniquely indicating an advertiser that initiated the campaign;

determining whether the tracking event packet is a duplicate based on the packet identification and marking the packet as invalid if the tracking event packet is determined to be a duplicate;

hashing, by a databus consumer, the advertiser identification;

aggregating, by the databus consumer dedicated to serving and performing operations on data from packets with advertiser identifications that hash to a same value, non-duplicate tracking event packets by advertiser identification such that packets with advertiser identifications that hash to the same value are aggregated together;

determining, by the databus consumer and based on the data from the packets with advertiser identifications that hash to a same value, budget and performance related metrics of the campaign;

determining whether the tracking event packet corresponds to a revenue generating tracking event, transferring, by the databus consumer, the budget and performance related metrics to a first database and a second database, the first database includes data stored for analytics and the second database includes data stored for billing and campaign performance monitoring;

transferring, by the databus consumer, aggregated tracking event packets to the first database and the second database sooner subsequent to the aggregation if it is determined that the aggregated event packets include a tracking event packet corresponding to a revenue generating tracking event than if the aggregated event packets do not include a tracking event packet corresponding to a revenue generating tracking event; and presenting analytics information using data from the transferred aggregated tracking event packets and the budget and performance related metrics on the first database or providing a bill to the advertiser using data from the transferred aggregated tracking event packets on the second database.

2. The machine-readable medium of claim 1, wherein the instructions for determining whether the tracking event packet is a duplicate include instructions for performing an increment operation on an entry in a third database, the entry associated with the packet identification, comparing a value returned from performing the increment operation to a specified duplicate value, and determining the tracking event packet is a duplicate if the value returned is greater than the specified duplicate value.

3. The machine-readable medium of claim 1, further comprising instructions which, when executed by the machine, cause the machine to perform operations comprising:

updating an advertisement stats table, a campaign stats table, and an account stats table by writing, in a single write request to the second database, an increment to an entry in the advertisement stats table based on the content identification, an entry in the creative stats table based on the campaign identification, and an entry in the account stats table based on the advertiser identification.

4. The machine-readable medium of claim 1, further comprising instructions which, when executed by the machine, cause the machine to perform operations comprising:

updating a daily campaign stats table, a monthly campaign stats table, and a lifetime campaign stats table by writing, in a single write request to the second database, an increment to an entry in the daily campaign stats table based on the campaign identification, an entry in the monthly campaign stats table based on the campaign identification, and an entry in the lifetime campaign stats table based on the campaign identification.

5. The machine-readable medium of claim 1, further comprising instructions which, when executed by the machine, cause the machine to perform operations comprising:

determining a campaign-level click through rate, an urgency for serving ads of the campaign, and an impressions or clicks per day of the campaign based on the received tracking event packet, wherein the urgency is based upon a value of a number of impressions or click events per unit time, on average, that are required to satisfy the campaign.

6. The machine-readable medium of claim 5, further comprising instructions which, when executed by the machine, cause the machine to perform operations comprising:

comparing the determined campaign-level urgency to a specified urgency threshold and, in response to determining the urgency is greater than the specified urgency threshold, removing content from the campaign that is performing worse than other content of the campaign.

7. The machine-readable medium of claim 6, wherein the instructions for removing content form the campaign that is performing worse than other content of the campaign include instructions for:

determining a content-level click through rate and a content-level impressions or clicks per day for each content of the campaign;

comparing the content-level click through rate and the content-level impressions or clicks per day to the campaign-level click through rate and at least one of campaign-level impressions per day and campaign-level clicks per day, respectively; and removing content from the campaign in response to determining, based on the comparison, that the content-level click through rate and the content-level impressions or clicks per day is less than the campaign-level click through rate and the campaign-level impressions or clicks per day, respectively.

8. The machine-readable medium of claim 1, further comprising instructions stored thereon which, when executed by the machine, cause the machine to perform operations comprising:

comparing a cost value in the cost field of the tracking event packet to a daily campaign budget; and setting a status field in the tracking event packet to indicate that the campaign is inactive in response to determining that the cost value is greater than or equal to the daily campaign budget.

9. The machine-readable medium of claim 1, wherein the instructions for receiving the tracking event packet from the front end tracking client include receiving only packets that include an advertiser identification value of a number of advertiser identification values that hash to a value associated with a partition of the medium.

10. A method for tracking user interaction with content of a website, the method comprising operations performed using one or more hardware processors, the operations comprising:

receiving a tracking event packet including data fields comprising a packet identification that uniquely indicates the tracking event packet, a tracking event identifier uniquely indicating a specific instance of the user interaction with the content, a content identifier uniquely indicating content with which the user interacted, a cost associated with the user interaction, a campaign identifier uniquely indicating a campaign with which the content is associated, and an advertiser identification uniquely indicating an advertiser that initiated the campaign;

determining whether the tracking event packet is a duplicate based on the packet identification and marking the packet as invalid if the tracking event packet is determined to be a duplicate;

hashing, by a databus consumer, the advertiser identification;

aggregating, by the databus consumer dedicated to serving and performing operations on data from packets with advertiser identifications that hash to a same value, non-duplicate tracking event packets by advertiser identification such that packets with advertiser identifications that hash to the same value are aggregated together;

determining, by the databus consumer and based on the data from the packets with advertiser identifications that hash to a same value, budget and performance related metrics of the campaign;

determining whether the tracking event packet corresponds to a revenue generating tracking event, transferring, by the databus consumer, the budget and performance related metrics to a first database and a second database, the first database includes data stored for analytics and the second database includes data stored for billing and campaign performance monitoring;

transferring, by the databus consumer, aggregated tracking event packets to the first database and the second database sooner subsequent to the aggregation if it is determined that the aggregated event packets include a tracking event packet corresponding to a revenue generating tracking event than if the aggregated event packets do not include a tracking event packet corresponding to a revenue generating tracking event; and presenting analytics information using data from the transferred aggregated tracking event packets and the budget and performance related metrics on the first database or providing a bill to the advertiser using data from the transferred aggregated tracking event packets on the second database.

11. The method of claim 10, wherein determining whether the tracking event packet is a duplicate includes performing an increment operation on an entry in a third database, the entry associated with the packet identification, comparing a value returned from performing the increment operation to a specified duplicate value, and determining the tracking event packet is a duplicate if the value returned is greater than the specified duplicate value.

12. The method of claim 10, further comprising updating an advertisement stats table, a campaign stats table, and an account stats table by writing, in a single write request to the second database, an increment to an entry in the advertisement stats table based on the content identification, an entry in the creative stats table based on the campaign identification, and an entry in the account stats table based on the advertiser identification.

13. The method of claim 10, further comprising updating a daily campaign stats table, a monthly campaign stats table, and a lifetime campaign stats table by writing, in a single write request to the second database, an increment to an entry in the daily campaign stats table based on the campaign identification, an entry in the monthly campaign stats table based on the campaign identification, and an entry in the lifetime campaign stats table based on the campaign identification.

14. A system for tracking user interaction with content of a website, the system comprising:

one or more hardware processors;

one or more memories communicatively coupled to the one or more hardware processors, the one or more memories including instructions stored thereon, which when executed by the one or more processors, cause the one or more processors to perform operations, the operations comprising:

receiving a tracking event packet including data fields comprising a packet identification that uniquely indicates the tracking event packet, a tracking event identifier uniquely indicating a specific instance of the user interaction with the content, a content identifier uniquely indicating content with which the user interacted, a cost associated with the user interaction, a campaign identifier uniquely indicating a campaign with which the content is associated, and an advertiser identification uniquely indicating an advertiser that initiated the campaign;

determining whether the tracking event packet is a duplicate based on the packet identification and marking the packet as invalid if the tracking event packet is determined to be a duplicate;

hashing, by a databus consumer, the advertiser identification;

aggregating, by the databus consumer dedicated to serving and performing operations on data from packets with advertiser identifications that hash to a same value, non-duplicate tracking event packets by advertiser identification such that packets with advertiser identifications that hash to the same value are aggregated together;

determining, by the databus consumer and based on the data from the packets with advertiser identifications that hash to a same value, budget and performance related metrics of the campaign;

determining whether the tracking event packet corresponds to a revenue generating tracking event, transferring, by the databus consumer, the budget and performance related metrics to a first database and a second database, the first database includes data stored for analytics and the second database includes data stored for billing and campaign performance monitoring;

transferring, by the databus consumer, aggregated tracking event packets to the first database and the second database sooner subsequent to the aggregation if it is determined that the aggregated event packets include a tracking event packet corresponding to a revenue generating tracking event than if the aggregated event packets do not include a tracking event packet corresponding to a revenue generating tracking event; and presenting analytics information using data from the transferred the budget and performance related metrics on the first database or providing a bill to the advertiser using data from the transferred aggregated tracking event packets on the second database.

15. The system of claim 14, wherein the operations further comprise determining a campaign-level click through rate, an urgency for serving ads of the campaign, and an impressions or clicks per day of the campaign based on the received tracking event packet, wherein the urgency is a value of a number of impressions or click events per unit time, on average, that are required to satisfy the campaign.

16. The system of claim 15, wherein the operations further comprise comparing the determined campaign-level urgency to a specified urgency threshold and, in response to determining the urgency is greater than the specified urgency threshold, removing content from the campaign that is performing worse than other content of the campaign.

17. The system of claim 16, wherein removing content from the campaign that is performing worse than other content of the campaign includes operations comprising:
   determining a content-level click through rate and a content-level impressions or clicks per day for each item of content of the campaign;
   comparing the content-level click through rate and the content-level impressions or clicks per day to the campaign-level click through rate and campaign-level impressions or clicks per day, respectively; and
   removing content from the campaign in response to determining, based on the comparison, that the content-level click through rate and the content-level impressions or clicks per day is less than the campaign-level click through rate and the campaign-level impressions or clicks per day, respectively.

18. The system of claim 14, wherein the operations further comprise:
   comparing a cost value in the cost field of the tracking event packet to a daily campaign budget; and
   setting a status field in the tracking event packet to indicate that the campaign is inactive in response to determining that the cost value is greater than or equal to the daily campaign budget.

* * * * *